(12) United States Patent
Niu et al.

(10) Patent No.: US 9,370,837 B2
(45) Date of Patent: Jun. 21, 2016

(54) WIRE ELECTRIC DISCHARGE MACHINE THAT AUTOMATICALLY CORRECTS MACHINING ROUTE ACCORDING TO CORNER ANGLE

(71) Applicant: FANUC CORPORATION, Minamitsuru-gun, Yamanashi (JP)

(72) Inventors: Yan Niu, Yamanashi (JP); Kaoru Hiraga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 390 days.

(21) Appl. No.: 14/100,880

(22) Filed: Dec. 9, 2013

(65) Prior Publication Data
US 2014/0175063 A1    Jun. 26, 2014

(30) Foreign Application Priority Data
Dec. 21, 2012    (JP) .................................. 2012-279357

(51) Int. Cl.
*B23H 7/06*    (2006.01)

(52) U.S. Cl.
CPC .................. *B23H 7/06* (2013.01); *B23H 7/065* (2013.01); *G05B 2219/45221* (2013.01); *G05B 2219/49164* (2013.01)

(58) Field of Classification Search
CPC combination set(s) only.
See application file for complete search history.

(56) References Cited

U.S. PATENT DOCUMENTS

| 3,058,657 A | * | 10/1962 | Tripp | G05B 19/371 318/573 |
| 4,523,073 A | * | 6/1985 | Gamo | B23H 7/065 219/69.12 |
| 4,703,143 A | * | 10/1987 | Okubo | B23H 7/065 219/69.1 |

(Continued)

FOREIGN PATENT DOCUMENTS

| JP | 59-175925 A | 10/1984 |
| JP | 61-219529 A | 9/1986 |

(Continued)

OTHER PUBLICATIONS

Office Action mailed Jul. 1, 2014, corresponds to Japanese patent application No. 2012-279357.

(Continued)

*Primary Examiner* — Dana Ross
*Assistant Examiner* — Renee L Miller
(74) *Attorney, Agent, or Firm* — Hauptman Ham, LLP

(57) ABSTRACT

A wire electric discharge machine corrects a machining route according to an angle between two moving blocks that form a corner portion. A correction distance and a return distance are computed based on a detected corner angle. The correction is implemented so that an end point of a block to be machined first is extended according to the correction distance, and a portion extending from a start point of a block to be machined subsequently to an intermediate point of this block is removed according to the return distance. A machining route is created so that the end point of the new block created by the extension is connected to the start point of the other block created by the removal, and the wire electrode is moved along the machining route relative to a workpiece.

7 Claims, 15 Drawing Sheets

(56) References Cited

U.S. PATENT DOCUMENTS

| | | | | |
|---|---|---|---|---|
| 4,947,336 A * | 8/1990 | Froyd | G05B 19/41 | |
| | | | 700/188 | |
| 5,237,145 A * | 8/1993 | Magara | B23H 7/10 | |
| | | | 219/69.12 | |
| 5,281,787 A * | 1/1994 | Arakawa | B23H 7/10 | |
| | | | 219/69.12 | |
| 5,338,912 A * | 8/1994 | Iwasaki | B23H 7/10 | |
| | | | 219/69.12 | |
| 5,340,958 A * | 8/1994 | Okazaki | B23H 7/10 | |
| | | | 140/112 | |
| 5,422,454 A * | 6/1995 | Kajitori | B23H 7/10 | |
| | | | 219/69.12 | |
| 5,428,200 A * | 6/1995 | Lodetti | B23H 7/10 | |
| | | | 219/69.12 | |
| 5,430,268 A * | 7/1995 | Truty | B23K 9/32 | |
| | | | 219/69.12 | |
| 5,434,379 A * | 7/1995 | Derighetti | B23H 7/10 | |
| | | | 219/69.12 | |
| 5,834,726 A * | 11/1998 | Drouet | B23H 7/065 | |
| | | | 219/69.12 | |
| 6,028,281 A * | 2/2000 | Yamada | B23H 7/065 | |
| | | | 219/69.12 | |
| 6,621,032 B1 * | 9/2003 | Katou | B23H 7/02 | |
| | | | 219/69.12 | |
| 6,627,835 B1 * | 9/2003 | Chung | B23H 7/02 | |
| | | | 219/121.72 | |
| 6,922,606 B1 * | 7/2005 | Yutkowitz | G05B 19/00 | |
| | | | 318/560 | |
| 7,230,200 B2 * | 6/2007 | Wehrli | B23H 7/10 | |
| | | | 219/69.12 | |
| 7,982,157 B2 * | 7/2011 | Schoepf | B23H 7/10 | |
| | | | 219/69.12 | |
| 8,829,383 B2 * | 9/2014 | Onodera | B23H 7/065 | |
| | | | 219/69.12 | |
| 2006/0065638 A1 * | 3/2006 | Sasaki | B23H 7/20 | |
| | | | 219/69.13 | |
| 2006/0102596 A1 * | 5/2006 | Kinoshita | B23H 7/04 | |
| | | | 219/69.12 | |
| 2008/0251500 A1 | 10/2008 | Hiraga et al. | | |
| 2013/0168363 A1 * | 7/2013 | Arakawa | B23H 1/04 | |
| | | | 219/69.15 | |
| 2013/0248494 A1 * | 9/2013 | Inaba | B23H 1/10 | |
| | | | 219/69.12 | |

FOREIGN PATENT DOCUMENTS

| | | |
|---|---|---|
| JP | 7-24645 A | 1/1995 |
| JP | 7-285029 A | 10/1995 |
| JP | 11-207527 A | 8/1999 |
| JP | 200836720 A | 2/2008 |

OTHER PUBLICATIONS

Extended European Search Report issued Oct. 24, 2014, corresponding to European patent application No. 13194981.0.

* cited by examiner

MACHINING ADVANCING DIRECTION

WIRE ELECTRIC DISCHARGE MACHINE THAT AUTOMATICALLY CORRECTS MACHINING ROUTE ACCORDING TO CORNER ANGLE

RELATED APPLICATIONS

The present application claims priority to Japanese Application Number 2012-279357, filed Dec. 21, 2012, the disclosure of which is hereby incorporated by reference herein in its entirety.

BACKGROUND OF THE INVENTION

1. Field of the Invention

The present invention relates to a wire electrical discharge machine that automatically corrects a machining route according to a corner angle.

2. Description of the Related Art

In wire electric discharge machining, it is known that a wire electrode is deflected in a direction different from (a direction opposite to or a direction making a predetermined angle with respect to) a machining advancing direction due to discharge repulsive force that occurs between the wire electrode and a workpiece, a turbulent flow of machining liquid, or the like. Although a wire electrode is deflected in a direction opposite to a machining advancing direction when a workpiece is machined into a linear shape by the wire electrode, the deflection does not affect the machined shape. However, the effect of deflection becomes apparent in machining of corner portions so that shape accuracy at corner portions is degraded too much, a so-called "corner shear drop" occurs, and a desired shape is not obtained.

FIG. 1 is a schematic diagram for describing machining of a corner portion using a wire electrode 3 of a wire electric discharge machine.

In wire electric discharge machining, in order for a workpiece 2 to be machined into a desired dimension, it is a common practice to create an offset route by adding the radius of the wire electrode 3 and a discharge gap to the dimension of an actual product shape and to move the wire electrode 3 along the created offset route. The offset route is referred to as a machining route 4. The value obtained by adding the radius of the wire electrode 3 and the discharge gap is referred to as an offset value.

As illustrated in FIG. 1, at a corner portion of the workpiece 2, the wire electrode 3 does not move along the machining route 4 due to deflection of the wire electrode 3 but moves along the inner side (see a wire electrode track 5 indicated by a broken line) of the machining route 4 so that the workpiece 2 is machined excessively. Due to this, a so-called "corner shear drop" (see a corner shear drop 6 resulting from deflection of the wire electrode) is formed, and a desired finished shape is not obtained. In order to deal with such a problem, the following two countermeasures are mainly proposed.

A first countermeasure alleviates deflection of a wire electrode by suppressing a machining speed or the amount of machining liquid, or extending a discharge pause time at corner portions (this countermeasure is also called "energy control").

A second countermeasure corrects a machining route by taking deflection of a wire electrode into consideration.

FIG. 2 is a diagram for describing the second countermeasure that corrects a machining route in order to avoid a workpiece from being excessively machined due to deflection of a wire electrode.

When wire electric discharge machining is performed while correcting the machining route 4 of the wire electrode 3 according to a correction route 7, the wire electrode 3 moves along the wire electrode track 8. In this manner, it is possible to avoid the workpiece 2 from being excessively machined.

Among the first and second countermeasures described above, the second countermeasure (that corrects the machining route) has advantages in that the machining period of the wire electric discharge machine is shorter than the energy control method of the first countermeasure, and several machining route correction methods have been proposed. Among the proposed correction methods, a technique of correcting a machining route based on a deflection amount of a wire electrode is disclosed in Patent Documents below, for example.

Japanese Patent Application Laid-Open No. 61-219529 (JP 61-219529,A) discloses a wire electric discharge machine controller including a control unit that controls a relative movement amount of a wire electrode, a storage unit that stores a deflection amount of the wire electrode on a working surface, a computing unit that sequentially determines a machining direction of the wire electrode according to computation, and a driving unit that drives the wire electrode with the same correction amount as the deflection amount of the wire electrode.

Japanese Patent Application Laid-Open No. 7-285029 (JP 7-285029,A) discloses a sharp edge machining method including storing a deflection amount of a wire electrode under wire-cut discharge machining for each machining condition, excessively allowing the wire electrode to freely move in an advancing direction during punching, and correcting a machining route so as to make a cut during die machining.

Japanese Patent Application Laid-Open No. 7-24645 (JP 7-24645,A) discloses a wire electric discharge machining apparatus including a control unit that controls a relative movement amount of a wire electrode, a corner detecting unit that detects a corner portion within a machining route, and a machining route correcting unit that sequentially corrects a predetermined distance of a tangential movement, a predetermined distance of an extended movement, and a gradual returning movement at the detected corner portion.

Japanese Patent Application Laid-Open No. 11-207527 (JP 11-207527,A) discloses a machining route correction method that includes extending a first machining route at a corner portion in a machining advancing direction to be on a tangential line, setting second and third correction routes at angles larger than a machining corner angle, and correcting the machining route so as to return to an original machining route in a fourth route and also discloses a wire electric discharge machining apparatus for realizing the machining route correction method.

Although the techniques disclosed in JP 61-219529,A and JP 7-285029,A correct the machining route using the deflection amount of the wire electrode as a correction amount, these correction methods mainly focus on machining when the corner angle is 90° and do not discuss the other coverage areas in detail. It is widely known that, when the corner angle decreases (that is, 90° or smaller), the wire electrode is strongly affected by disturbance such as the flow of a machining liquid at a corner vertex portion and the machining accuracy at the corner portion is further degraded. Therefore, if the same correction amount is applied to all corner angles regardless of a corner angle, there is a problem that a desired machined shape is not always obtained.

The technique disclosed in JP 7-24645,A requires a plurality of correction amounts because the machining route is corrected in three steps or more. In this technique, a plurality of correction amounts are changed according to the corner angle, and the other correction amounts are determined based on an experimental value. Although some correction amounts are determined based on the corner angle, it is not described in detail how the correction amount is changed according to the corner angle. Moreover, since the other correction amounts are setting values and a large amount of time and effort is required to calculate various setting values that can deal with various machining patterns present in the world as needed by users, there is a problem in that it is practically very difficult to determine the correction amounts.

The technique disclosed in JP 11-207527,A requires a plurality of correction amounts because the machining route is corrected in a number of steps. The plurality of (four) correction amounts is determined based on a machining type or a thickness of a workpiece according to the corner angle. Even when the machining types are the same, the degree of deflection of a wire electrode is different depending on the material, the thickness, or the like of the workpiece, and desired shape accuracy is not always obtained if the machining route is corrected by the same correction amount. By the same reason, even when the thicknesses of workpieces are the same, if the machining types, the materials of the workpieces, or the like are different, there is a problem in that desired shape accuracy is not obtained unless the correction amount is adjusted. Moreover, JP 11-207527,A does not describe in detail how the correction amount is to be changed according to the corner angle.

SUMMARY OF THE INVENTION

The present invention has been made in view of the problems of the conventional technique, and an object of the present invention is to provide a wire electric discharge machine capable of correcting a machining route according to an angle between two moving blocks that form a corner portion to improve shape accuracy during machining.

A wire electric discharge machine according to the present invention creates a machining route based on an axial movement command of a machining program, corrects the created machining program, at a corner portion formed by two consecutive moving blocks within the created machining route, by extending an end point of a block to be machined first to form a new block, removing a portion extending from a start point of a block to be machined subsequently to an intermediate point to form another new block, and connecting the end point of the new block and the start point of the other new block, and carries out discharge machining according to the corrected machining program. The wire electric discharge machine includes a corner angle acquiring unit that calculates a corner angle of the corner portion; and a machining route correcting unit that corrects the machining route according to the corner angle. The machining route correcting unit sets, when the end point of the block to be machined first is extended, an extension distance of the end point as a correction distance a, and also sets a length of the portion to be removed extending from the start point of the block to be machined subsequently to the intermediate point as a return distance b, and corrects the machining route at the corner portion so that the larger the corner angle, the smaller any one of or both of the correction distance a and the return distance b.

The machining route correcting unit may correct the machining route by calculating the correction distance a and the return distance b according to the following:

$$a=P$$

$$b=Q/\tan(\theta/2)+R.$$

Alternatively, the machining route correcting unit may correct the machining route by calculating the correction distance a and the return distance b according to the following:

$$a=Q/\tan(\theta/2)$$

$$b=P$$

where $\theta$ is a corner angle; P is a deflection amount of a wire electrode; Q is an offset amount; and R is a constant of a wire electrode diameter.

The machining route correcting unit may correct the machining route by calculating the correction distance a and the return distance b according to the following:

$$a=Q/\tan(\theta/2)$$

$$b=P$$

where $\theta$: a corner angle; P: a deflection amount of a wire electrode; and Q: an offset amount.

The machining route correcting unit may correct the machining route by calculating the correction distance a and the return distance b according to the following:

$$a=b\times\sin\alpha/\sin(\theta-\alpha)$$

$$b=P$$

where $\alpha=\tan^{-1}\{P/(Q+R)\}$; $\theta$: a corner angle; P: a deflection amount of a wire electrode; Q: an offset amount; and R: a constant of a wire electrode diameter.

The machining route correcting unit may correct the machining route by calculating the correction distance a and the return distance b according to the following:

$$a=P/\sin\theta$$

$$b=Q/\tan(\theta/2)+R$$

where $\theta$: a corner angle; P: a deflection amount of a wire electrode; Q: an offset amount; and R: a constant of a wire electrode diameter.

The machining route correcting unit may correct the machining route by calculating the correction distance a and the return distance b according to the following:

$$a=b\times\sin\alpha/\sin(\theta-\alpha)$$

$$b=Q/\tan(\theta/2)+R$$

where $\alpha=\tan^{-1}\{P/(Q+R)\}$; $\theta$: a corner angle; P: a deflection amount of a wire electrode; Q: an offset amount; and R: a constant of a wire electrode diameter.

A constant determined for each of electrical machining conditions may be used instead of the "deflection amount of the wire electrode", and the "offset amount" is any one of a radius value of the wire electrode, a value obtained by adding the radius value of the wire electrode and a discharge gap, and the constant determined for each of the electrical machining conditions.

The present invention can provide a wire electric discharge machine capable of correcting a machining route according to an angle between two moving blocks that form a corner portion to improve shape accuracy during machining.

BRIEF DESCRIPTION OF THE DRAWINGS

The above and other objects and features of the present invention will be apparent from the following description of an embodiment with reference to the appended drawings, in which.

DESCRIPTION OF THE PREFERRED EMBODIMENTS

Figure 1:
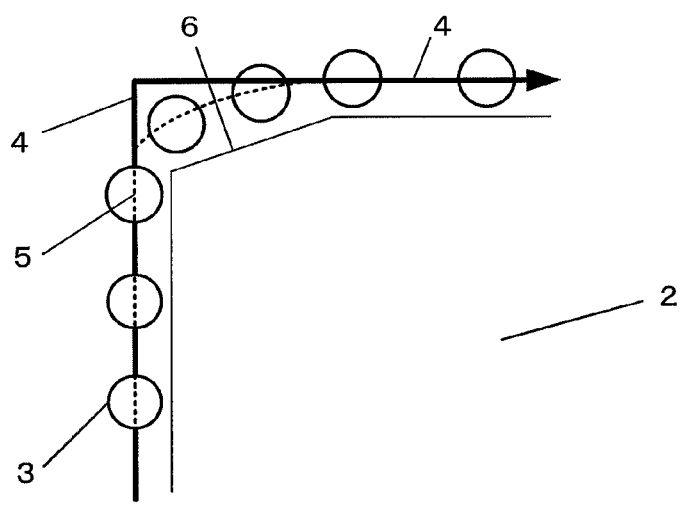
FIG. 1 is a schematic diagram for describing machining of a corner portion using a wire electrode of a wire electric discharge machine.
Figure 2:
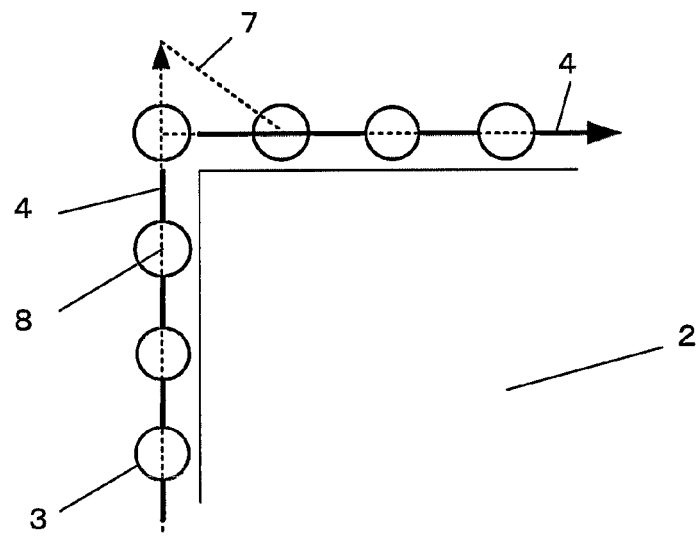
FIG. 2 is a diagram for describing a method of correcting a machining route in order to avoid a workpiece from being excessively machined due to deflection of the wire electrode.

A wire electric discharge machine of the present invention corrects a machining route so that an end point of a block (block 1) to be machined first is extended at a corner portion formed by two consecutive moving blocks (blocks 1 and 2) within the machining route to create a new block (block 1'), removes a portion extending from a start point of a block (block 2) to be machined subsequently to an intermediate point to create a new block (block 2') so that an end point of the new block (block 1') and a start point of the new block (block 2') are connected. With correction of the machining route by the wire electric discharge machine, the time and labor required for preparing various correction amounts are remarkably reduced, and the shape accuracy at corner portions is improved even when the corner angle is not 90°.

The wire electric discharge machine according to the present invention creates the correction route according to the corner angle in order to improve insufficiency of shape accuracy resulting from correction of the machining route according to the deflection amount of the wire electrode. Specifically, the wire electric discharge machine according to the present invention corrects the machining route at the corner portion so that the smaller the corner angle, the larger the correction amount, and the larger the corner angle, the smaller the correction amount.

Here, the reason why the machining route is corrected in the above-described manner in order to improve the machining shape accuracy of the wire electric discharge machining will be described with reference to FIGS. 3 and 4.

A workpiece 2 is machined by a wire electrode 3, whereby a machining groove formed by machining groove walls 15 and 16 is machined. In FIGS. 3 and 4, the intersection points between perpendicular lines drawn from a vertex C of a corner of the workpiece 2 to (first and second) machining routes 9 indicated by a one-dot chain line are B and D, respectively, and the intersection point of the (first and second) machining routes 9 before correction is A.

Figure 3:
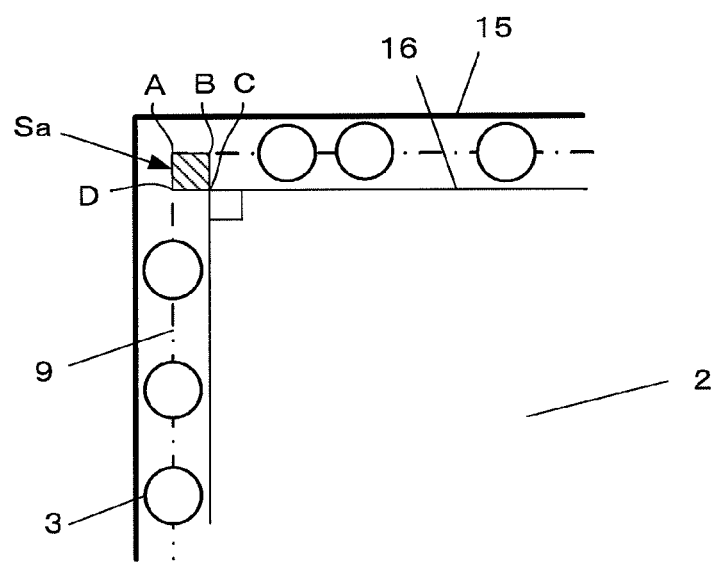
FIG. 3 is a diagram for describing correction of the machining route performed by the wire electric discharge machine according to the present invention (case where the angle of a corner portion is 90°)
Figure 4:
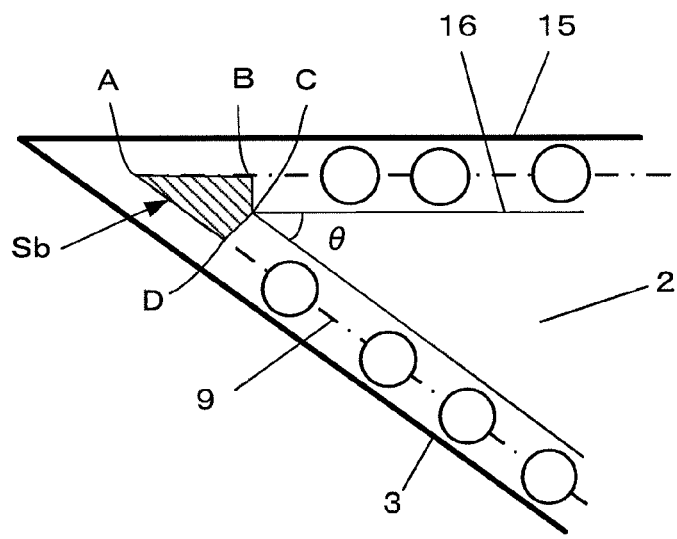
FIG. 4 is a diagram for describing correction of the machining route performed by the wire electric discharge machine according to the present invention (case where the angle of a corner portion is smaller than 90°)

As illustrated in FIG. 3, when the corner angle θ of a corner portion is 90°, the area of a rectangle ABCD is "Sa." On the other hand, as illustrated in FIG. 4, when the corner angle θ of the corner portion is smaller than 90°, the area of a rectangle ABCD is "Sb." If the discharge gap is the same, the area Sb (see FIG. 4) of a rectangle formed by the points A, B, C, and D when the corner angle θ is smaller than 90° is larger than the area Sa (see FIG. 3) when the corner angle is 90°.

Figure 5:
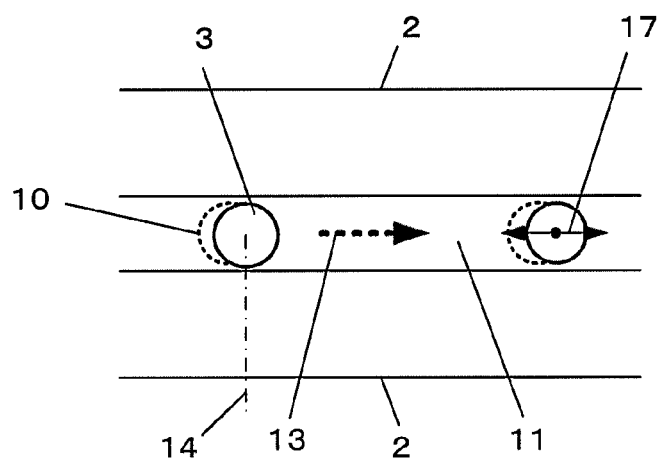
FIG. 5 is a diagram for describing a case where a wire electrode is sandwiched between both walls that constitute a machining groove 11 of a workpiece, and the wire electrode vibrates and is deflected in a machining advancing direction.
Figure 6:
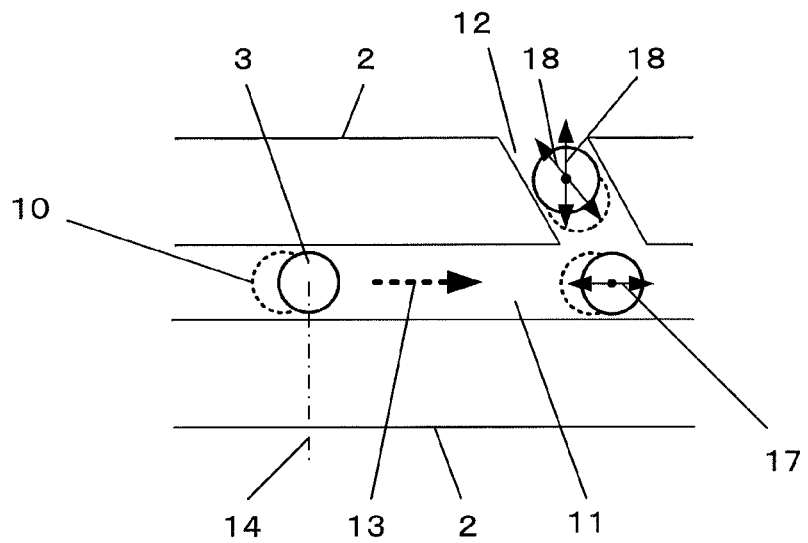
FIG. 6 is a diagram for describing a case where a wire electrode is present at an intersection point between two machining grooves of a workpiece, and the wire electrode is deflected into a machined groove.

FIG. 5 is a diagram for describing a case where the wire electrode 3 enters into a machining groove 11 of the workpiece 2, and the wire electrode 3 vibrates or is deflected in a machining advancing direction. FIG. 6 is a diagram for describing a case where the wire electrode 3 is present at the intersection point between two machining grooves 11 and 12 of the workpiece 2, and the wire electrode 3 is deflected into a machined machining groove.

As illustrated in FIG. 5, when the wire electrode 3 is sandwiched between both walls that form the machining groove 11 of the workpiece 2, the wire electrode 3 vibrates (indicated by reference numeral 17) or is deflected in a machining advancing direction (indicated by reference numeral 13) to shift from a programmed wire electrode position 14. However, as illustrated in FIG. 6, when the wire electrode 3 is present at the intersection point between the two machining grooves 11 and 12, the wire electrode 3 tends to be deflected toward the machined groove (see deflection indicated by reference numeral 18) due to the influence of the flow of a machining liquid supplied into the machining grooves 11 and 12 rather than just vibrating (indicated by reference numeral 17) or deflecting in the machining advancing direction 13. When the wire electrode 3 escapes from the intersection point between the machining grooves 11 and 12 and enters into the formed machining groove 12, the wire electrode 3 is sandwiched between both walls that form the machining groove, which has no adverse effect on a machined shape.

The "playing" space formed at the vertex of a corner is defined by the area of a rectangle ABCD illustrated in FIGS. 3 and 4. Thus, the larger the area of the rectangle ABCD, the more the wire electrode 3 is likely to be deflected toward the groove machined earlier, whereby the shape accuracy at the vertex of the corner is degraded.

As illustrated in FIG. 4, the area Sb of the rectangle ABCD when the corner angle θ is smaller than 90° is larger than the area Sa of the rectangle ABCD when the corner angle θ illustrated in FIG. 3 is 90°. That is, the "playing" space is large. Thus, when the correction route of the machining route is created, the correction amount needs to be larger than the correction amount when the corner angle is 90° by taking the "playing" space into consideration. Moreover, due to the same reason, when the corner angle θ is larger than 90°, since the "playing" space decreases, the correction amount needs to be smaller than the correction amount when the corner angle is 90°.

By the above reasons, in the present invention, when the corner portion of a workpiece having various corner angles θ is machined by wire electric discharge machining, in order to reliably improve the machining accuracy at the corner portion, the machining route at the corner portion is corrected so that the smaller the corner angle θ, the larger the correction amount, and the larger the corner angle θ, the smaller the correction amount.

Here, a method of reducing the time and labor of changing the correction amount according to the corner angle θ will be described.

As described above, the major reason why the corner shear drop (see FIG. 1) occurs is the deflection of the wire electrode 3. Due to this, when the deflection amount of the wire electrode 3 is used as a parameter for calculating a correction amount used for correcting the machining route, it is possible to create the correction route efficiently if the deflection amount of the wire electrode 3 is known regardless of the corner angle θ. In order to correct the machining route so that the end point of a block (block 1) to be machined first is extended to create a new block (block 1'), and remove a portion extending from the start point of a block (block 2) to be machined subsequently to an intermediate point to create a new block (block 2') so that the end point of the new block (block 1') and the start point of the new block (block 2') are connected, a "correction distance" and a "return distance" may be used, and the time and labor required for taking various other correction amounts into consideration can be eliminated.

Figure 7:
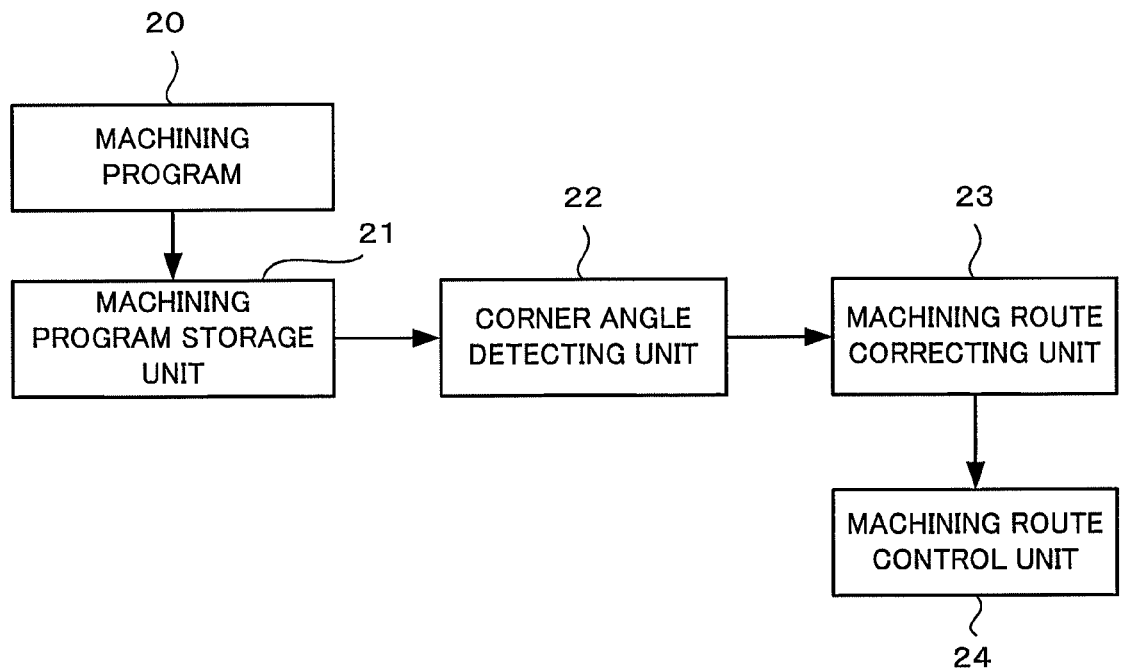
FIG. 7 is a block diagram for describing a main part of a wire electric discharge machine according to the present invention.

FIG. 7 is a block diagram for describing the configuration of a main part of a wire electric discharge machine according to the present invention.

The wire electric discharge machine according to the present invention can automatically correct the machining route according to the angle between the two moving blocks that form a corner portion. Blocks of a machining program 20 are read from a machining program storage unit 21 in which the machining program 20 is stored and are analyzed, and a corner angle detecting unit 22 determines whether corners are present or not. When a corner is present, a machining route correcting unit 23 creates a correction route according to the angle of the corner, and a machining route control unit 24 causes the wire electrode 3 to move along the correction route in relation to the workpiece 2. On the other hand, when a corner is not present, the machining route control unit 24 causes the wire electrode 3 to move in relation to the workpiece without creating the correction route.

The machining route correcting unit 23 computes a correction distance and a return distance based on the corner angle detected by the corner angle detecting unit 22, corrects the machining route so that the end point of the block (block 1) to be machined first is extended according to the correction distance to create a new block (block 1'), removes a portion extending from the start point of the block (block 2) to be machined subsequently to the intermediate point according to the return distance to create a new block (block 2') so that the end point of the new block (block 1') and the start point of the new block (block 2') are connected, and outputs the corrected machining route to the machining route control unit 24.

Next, various aspects of the machining route correction performed by the wire electric discharge machine according to the present invention will be described. As described above, in the conventional technique, although a method of creating a correction route using the deflection amount of a wire electrode as a correction amount has been proposed, it is not described in detail how the wire electrode will return from the created correction route to an original machining route. Therefore, in the respective aspects of the machining route correction performed by the wire electric discharge machine according to the present invention, a method of returning the wire electrode from the correction route to the original machining route will be discussed, and the correction route is created according to the corner angle θ.

A. A first aspect of machining route correction that corrects a machining route by setting a "correction distance" to a deflection amount (fixed value) of the wire electrode and changing a "return distance" according to the corner angle θ will be described.

Figure 8:
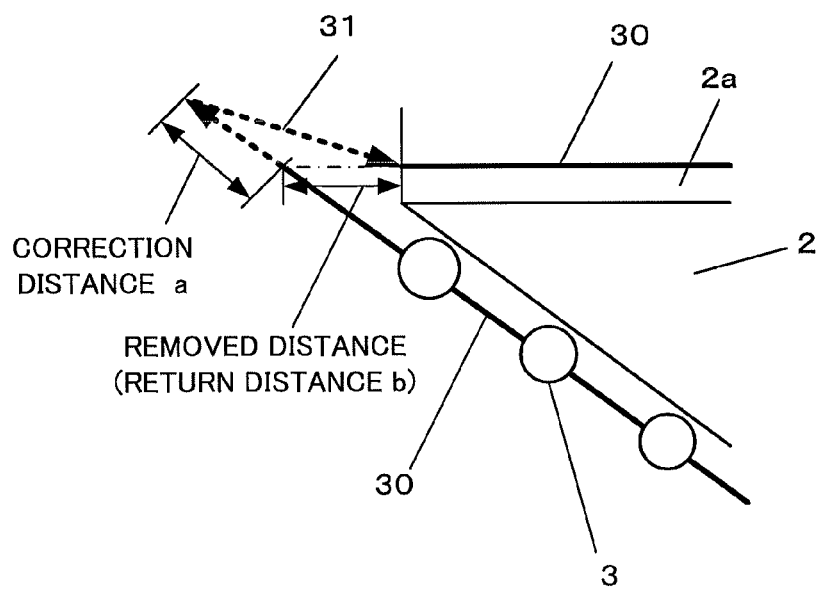
FIG. 8 is a diagram for describing a first aspect of machining route correction that corrects a machining route by setting a distance (correction distance a) extended from an end point of a block to be machined first to a constant value.

As illustrated in FIG. 8, the distance extended from the end point of the block (block 1) to be machined first will be referred to as a "correction distance a", and the distance removed from the portion extending from the start point of the block (block 2) to be machined subsequently to the intermediate point will be referred to as a "return distance b". This correction distance a is a deflection amount v (fixed value) of the wire electrode. A portion of the workpiece 2, indicated by reference numeral 2a, is machined by the wire electrode 3. When the wire electrode 3 enters into a machining groove, although the wire electrode 3 is sandwiched between both walls that form the machining groove and deforms in a direction opposite to the machining advancing direction, the wire electrode 3 rarely deflected in the other directions.

Figure 9:
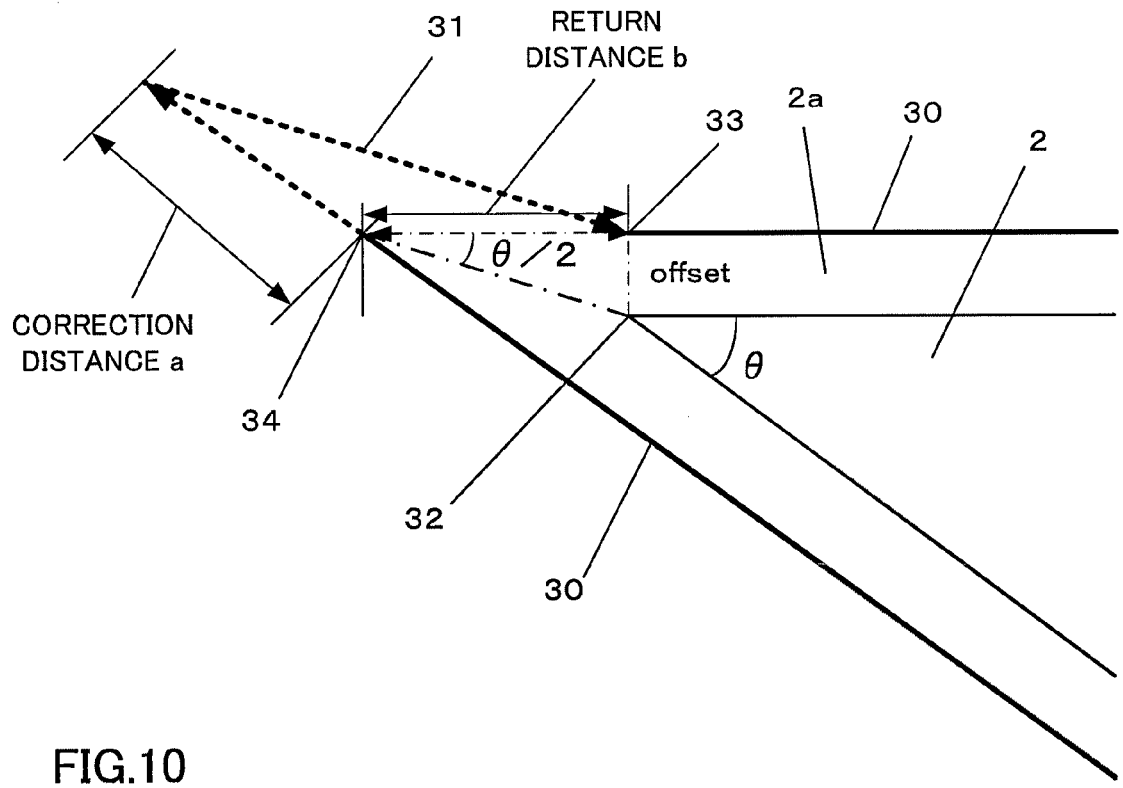
FIG. 9 is a diagram for describing an aspect of correcting the machining route using a portion extending from a start point of a block to be machined subsequently to an intermediate point as a removing distance (return distance b)

Therefore, as illustrated in FIG. 9, a perpendicular line is drawn from a corner vertex 32 of the workpiece 2 to a machining route 30. Moreover, a distance "offset" from an intersection point 33 between the perpendicular line and the machining route 30 to the corner vertex 32 is referred to as an offset amount. Here, the corner vertex 32 means a vertex of a corner of a shape obtained after machining the workpiece 2.

The distance between the corner vertex 34 on the machining route and the intersection point 33 is referred to as the "return distance b" of the wire electrode 3. The corner vertex 34 on the machining route is the intersection point between the block (block 1) to be machined first and the block (block 2) to be machined subsequently before the machining route is corrected. That is, the corner vertex 34 on the machining route is the end point of the block (block 1) to be machined first and the start point of the block (block 2) to be machined subsequently. In order to calculate the correction distance a and the return distance b, the following expression (1) can be used.

$$a = v$$
$$b = \text{offset}/\tan(\theta/2) \quad (1)$$

Figure 10:
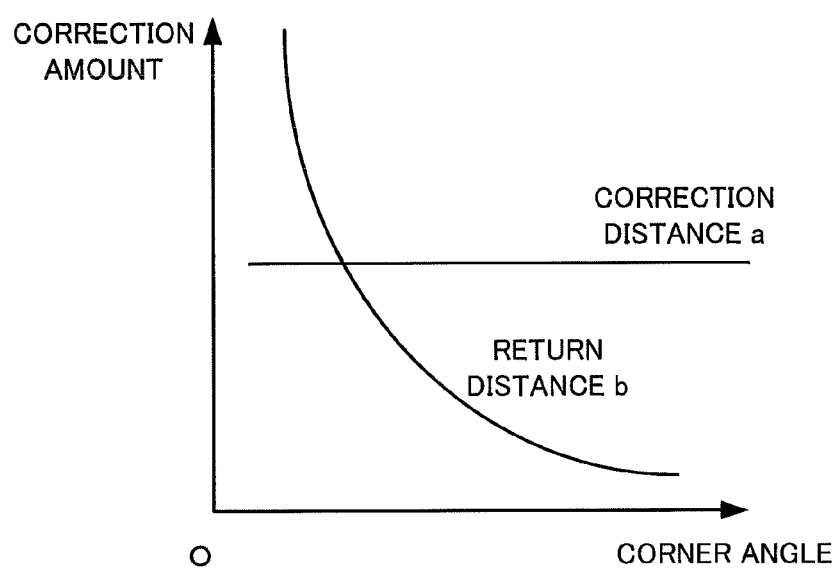
FIG. 10 is a diagram for describing correction of the machining route by setting the correction distance a to a constant value and changing the return distance b according to the corner angle.

From the expression (1), it can be understood that the return distance b changes according to the corner angle θ. The correction amount changes so that up to angles of 120°, the larger the corner angle θ, the smaller the return distance b, and conversely, the smaller the corner angle θ, the larger the return distance b (see FIG. 10). In this manner, correcting the machining route by changing the return distance b according to the corner angle θ can better improve the shape accuracy at the corner portion rather than correcting the machining route using both the correction distance a and the return distance b as the deflection amount of the wire electrode 3 (regardless of the corner angle θ). The corner angle θ can be computed using the inner product between the block (block 1) to be machined first and the block (block 2) to be machined subsequently.

Figure 16:
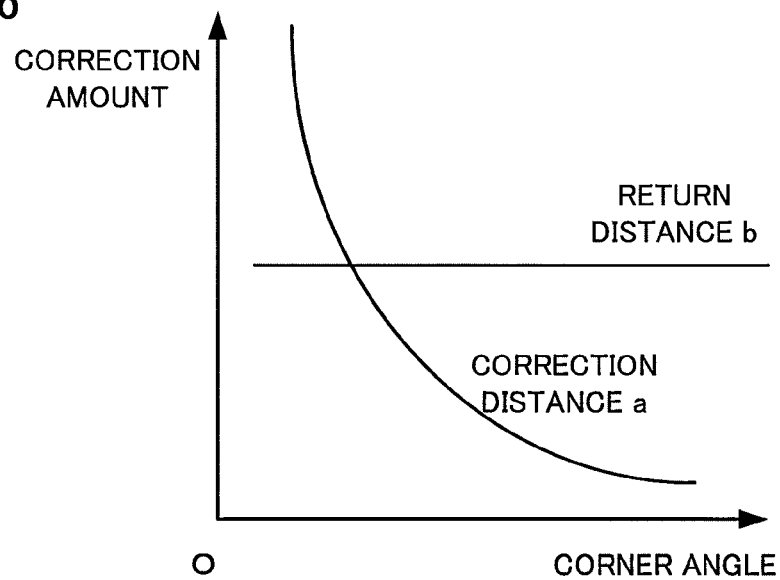
FIG. 16 is a graph for describing a change in the correction amount such that the larger the corner angle, the smaller the correction distance, and the smaller the corner angle, the larger the correction distance.

In the above example, although the machining route is corrected by setting the correction distance a to be constant (=v) and the return distance b to be variable dependent on the corner angle θ, instead of this, the shape accuracy at the corner portion can also be improved by correcting the machining route by setting the return distance b to be constant and the correction distance a to be variable dependent on the corner angle θ (see FIG. 16). Moreover, depending on machining conditions and required accuracy, a constant may be also added to the expression (1) that calculates the return distance b. Further, in the first aspect of machining route correction, although the return distance b is calculated using a trigonometric function using offset values, the return distance b may be calculated using the other parameters or according to the other computing methods.

Figure 11:
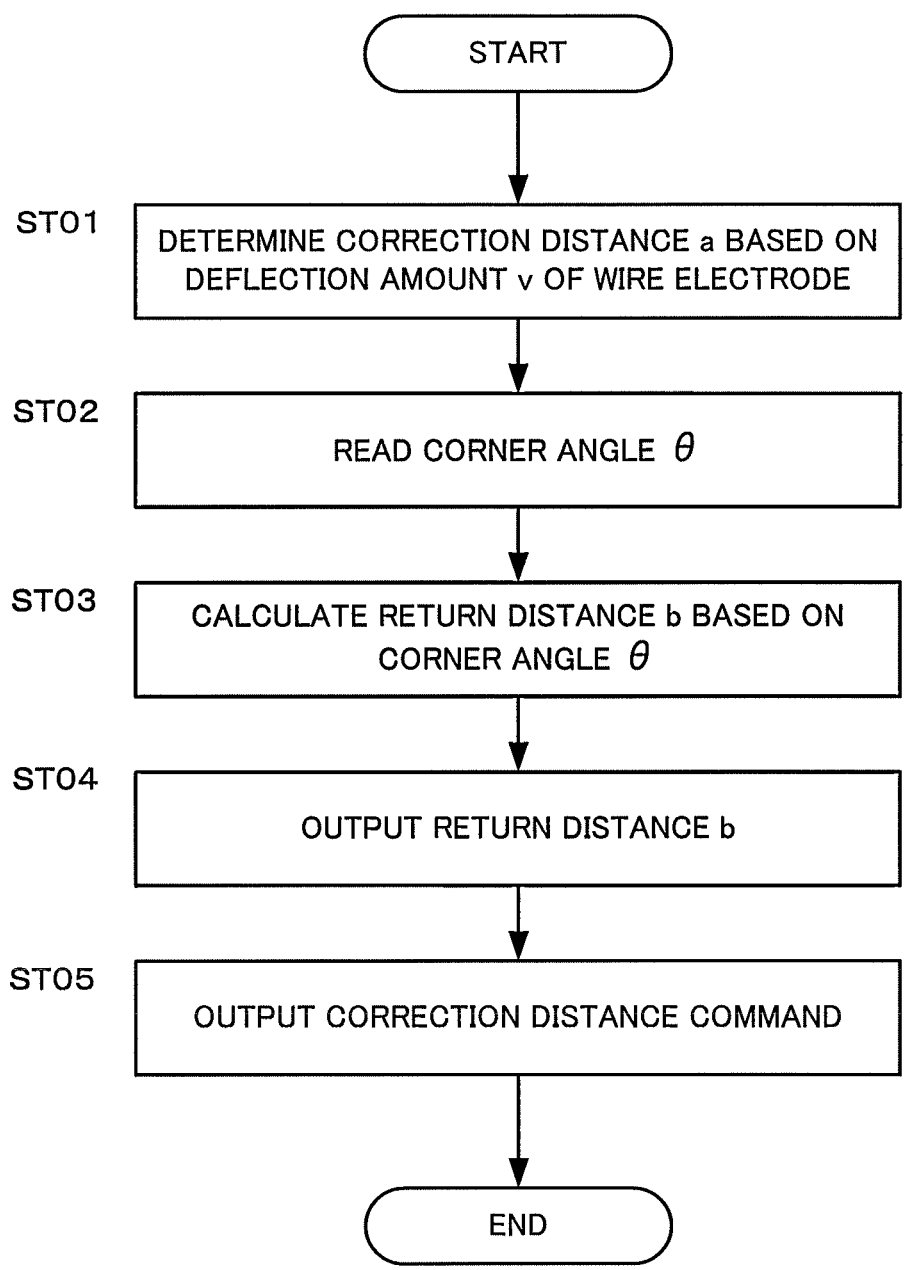
FIG. 11 is a flowchart for describing a machining route correcting process executed by a machining route correcting unit of the wire electric discharge machine according to the present invention.

FIG. 11 is a flowchart illustrating an aspect of machining route correction performed by the machining route correcting unit of the wire electric discharge machine according to the present invention. Hereinafter, respective steps will be described.

In step ST01, the correction distance a is determined based on the deflection amount v of the wire electrode.

In step ST02, the corner angle θ is read.

In step ST03, the return distance b is calculated based on the read corner angle θ.

In step ST04, the calculated return distance b is output.

In step ST05, the correction route is created based on the correction distance a and the return distance b, the created correction route is output as an instruction, and this process ends.

B. A second aspect of machining route correction that corrects the machining route by setting the "return distance b" to the deflection amount (fixed value) of the wire electrode and changing the "correction distance a" according to the corner angle θ will be described.

Figure 12:
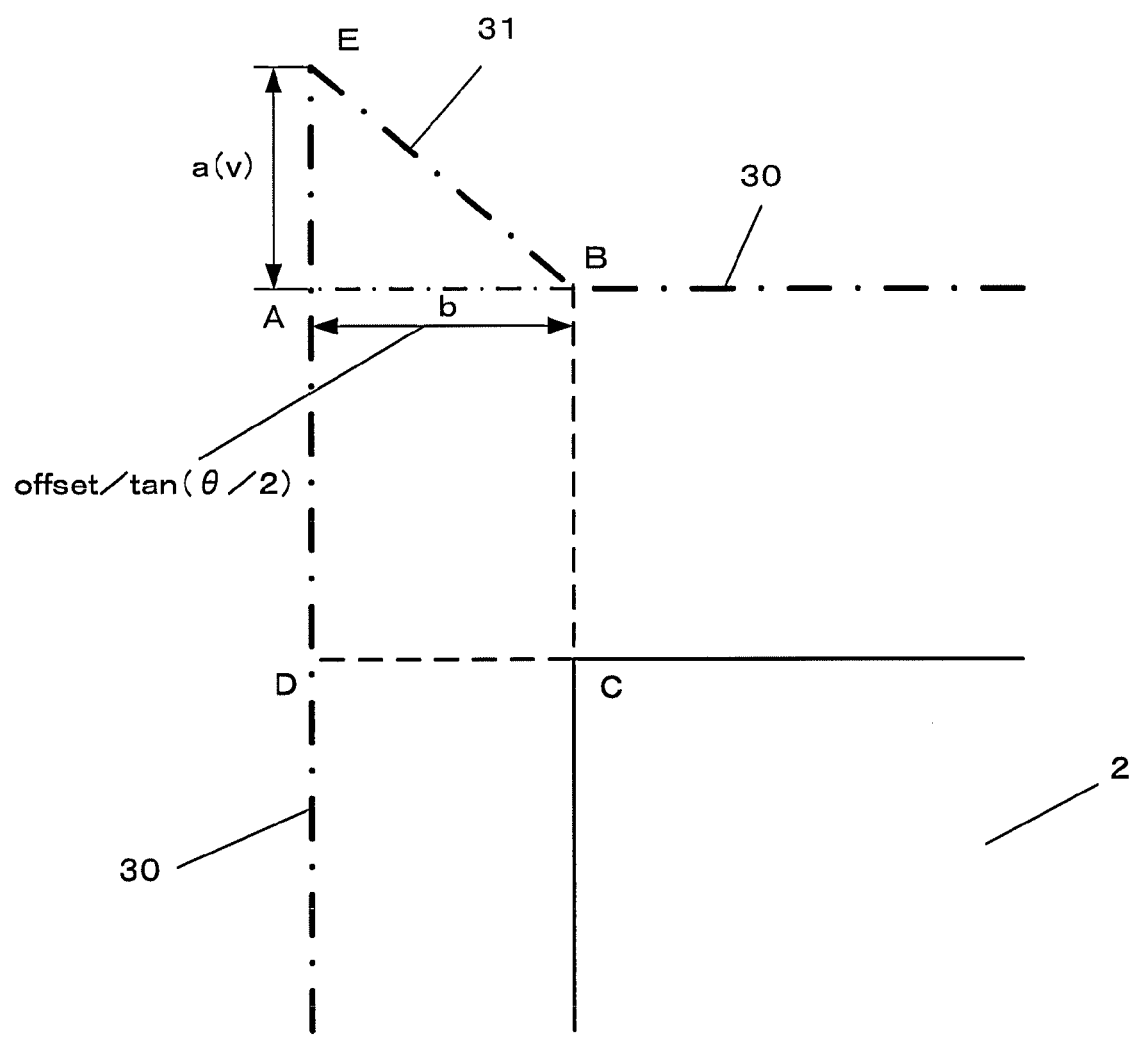
FIG. 12 is a diagram for describing a first aspect of machining route correction that corrects the machining route by setting the correction distance a to be constant and changing the return distance b according to the corner angle.

In the first aspect of the machining route correction, as illustrated in FIG. 12, the machining route is corrected by setting the correction distance a to the deflection amount v of the wire electrode 3 (regardless of the corner angle θ) and changing the return distance b according to the corner angle θ. In this manner, it is known that the shape accuracy at the corner portion can be better improved by correcting the machining route by changing the return distance b according to the corner angle θ rather than correcting the machining route by setting both the correction distance a and the return distance b to the deflection amount of the wire electrode 3 (regardless of the corner angle θ).

In contrast, the shape accuracy at the corner portion may be improved by correcting the machining route by fixing the return distance b and changing the correction distance a according to the corner angle.

Figure 13:
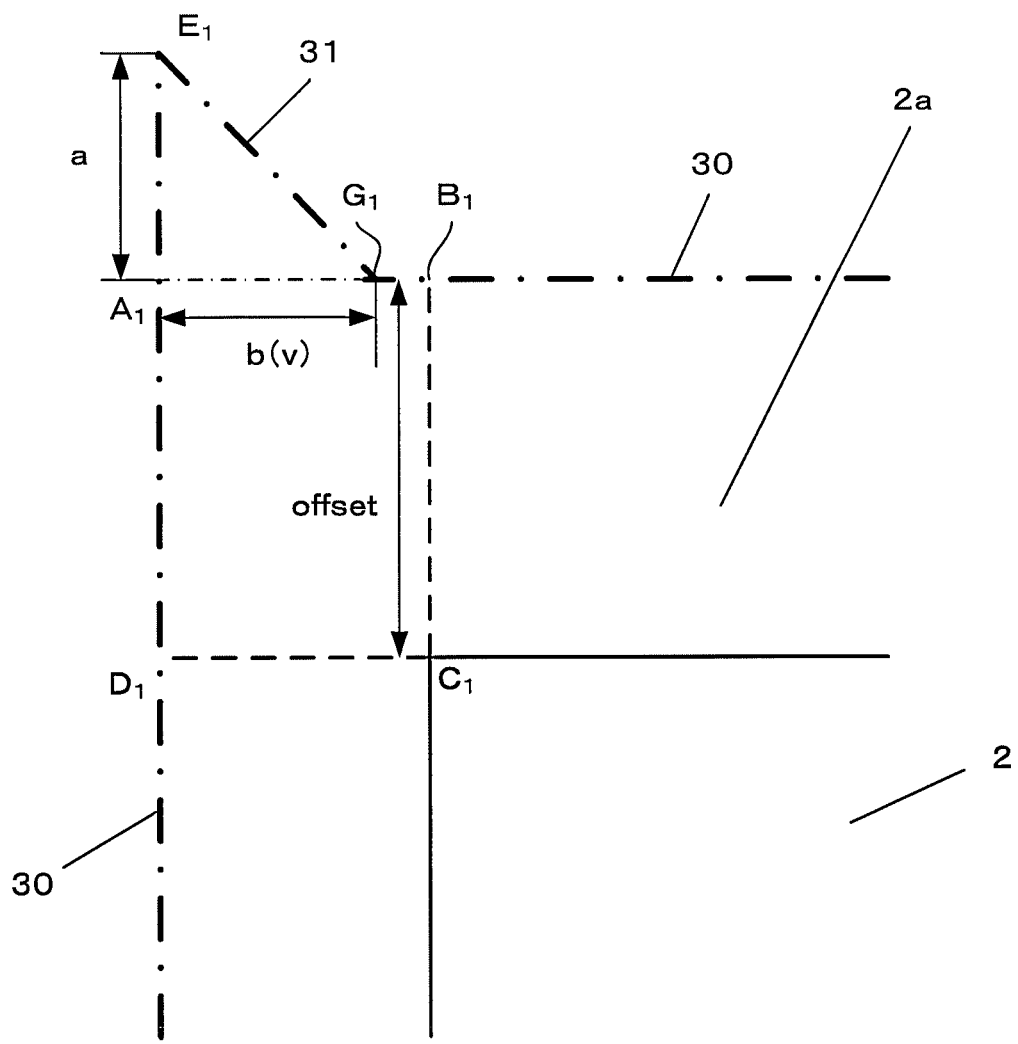
FIG. 13 is a diagram for describing a second aspect of machining route correction that corrects the machining route by setting the return distance b to be constant and changing the correction distance a according to the corner angle.

Therefore, in the second aspect of the machining route correction, as illustrated in FIG. 13, the machining route is corrected by fixing the return distance b and changing the correction distance a according to the corner angle.

When the wire electrode 3 enters into the machining groove, as described above with reference to FIG. 5, although the wire electrode 3 is deflected in a direction opposite to the machining advancing direction, the wire electrode 3 is rarely deflected in the other directions. Therefore, when machining of the block (block 1) to be machined first ends, and the wire electrode 3 passes through the corner portion and enters into the machining groove formed in the block (block 2) to be machined subsequently, it is thought that there is no influence on the shape accuracy at the corner portion.

Figure 14:
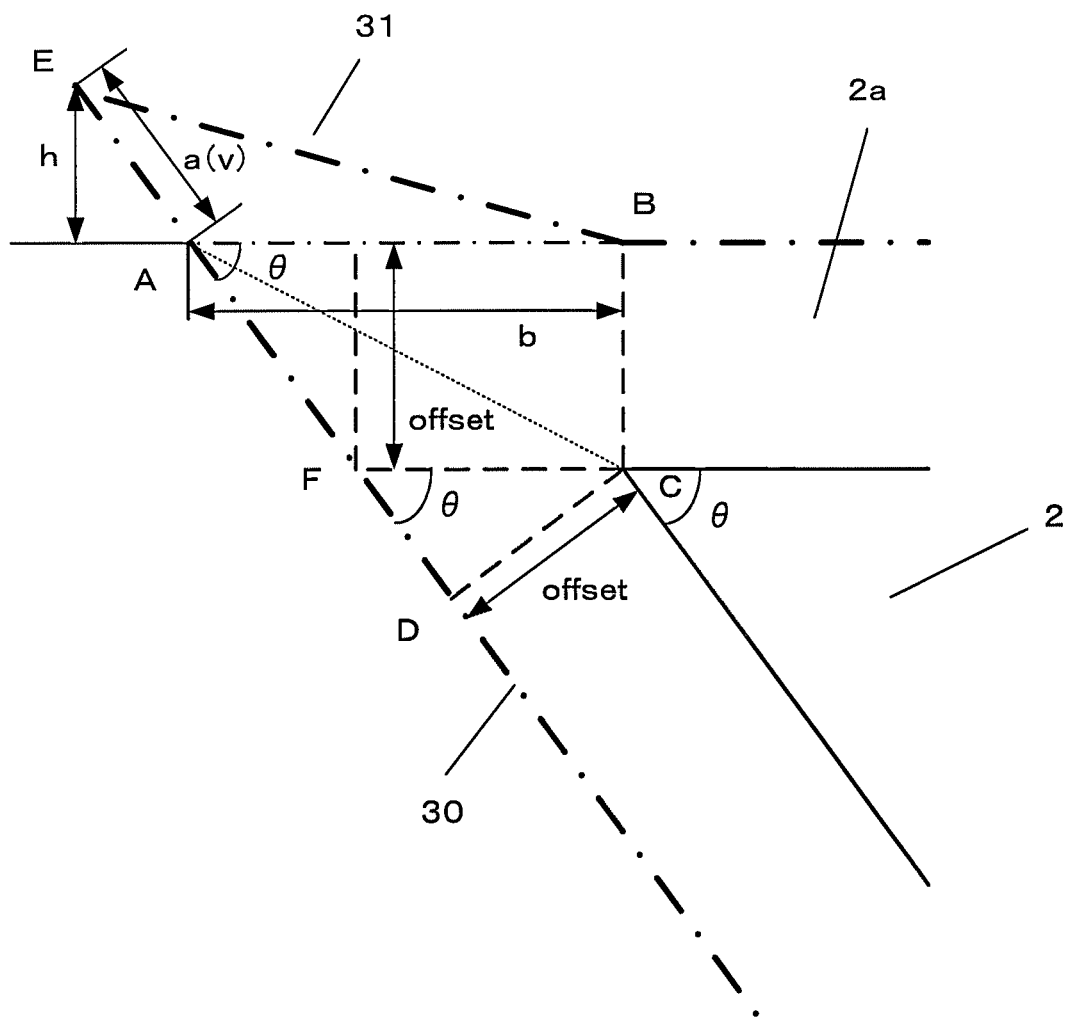
FIG. 14 is a diagram for describing a correction route according to the first aspect of machining route correction.
Figure 15:
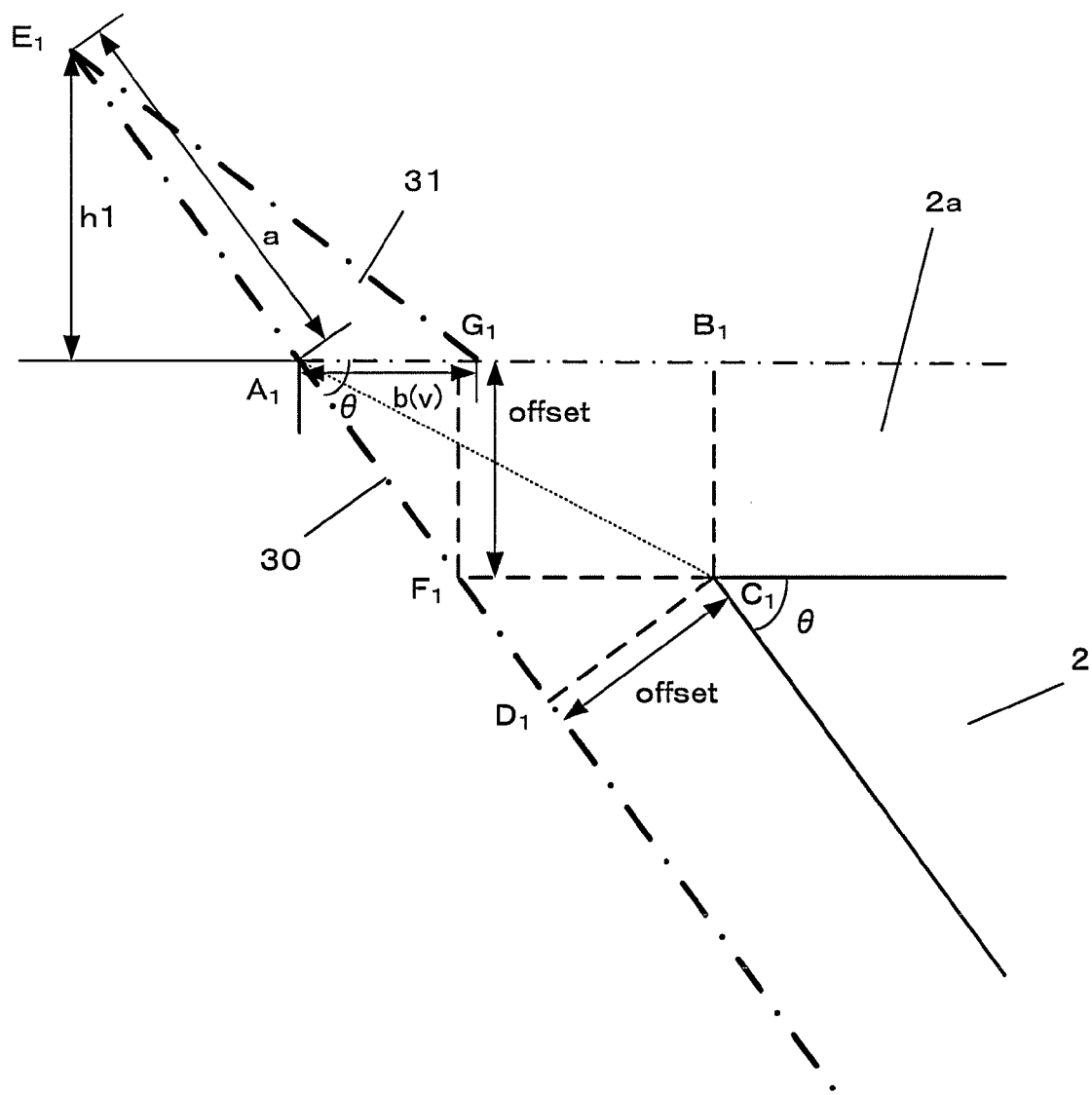
FIG. 15 is a diagram for describing a correction route according to the second aspect of machining route correction.

Thus, in the case of the machining advancing direction illustrated in FIG. 15 (the second aspect of machining route correction), similarly to the case of machining advancing direction illustrated in FIG. 14 (the first aspect of machining route correction), when the wire electrode 3 moves up to a point $B_1$ separated by offset/$\tan(\theta/2)$ from the intersection point $A_1$ of the machining route before correction due to the corner angle θ, there is no adverse effect on the corner vertex resulting from deflection of the wire electrode 3.

Moreover, by the same reason, it is known that, when the wire electrode 3 moves up to a point $D_1$ separated by offset/$\tan(\theta/2)$ from the intersection point A of the machining route before correction, an adverse effect on the corner shape starts appearing. Due to this, the area of a rectangle $A_1B_1C_1D_1$ in FIG. 15 is the "playing" space of the wire electrode 3 that determines the shape of a corner portion.

When the corner angle θ is 90°, as illustrated in FIG. 12 (the first aspect of machining route correction), the shape accuracy at the corner portion can be improved by setting the correction distance a to the deflection amount v of the wire electrode 3 and setting the return distance b to an offset value "offset" (in the case of θ=90', offset/tan(θ/2)=offset). That is, in order to correct the "playing" space based on the area of the rectangle ABCD, the machining route may be corrected based on the area of a triangle AEB of which both sides are the correction distance a and the return distance b.

Due to this, by using the relation between the areas of the rectangle ABCD and the triangle AEB of FIG. 14 illustrating the first aspect of machining route correction and the relation between a rectangle $A_1B_1C_1D_1$ and a triangle $A_1E_1G_1$ of FIG. 15 illustrating the second aspect of machining route correction, the correction route can be calculated by setting the return distance b to a fixed value and changing the correction distance a according to the corner angle θ (see FIGS. 12 and 13).

When the corner angle θ and the offset value are the same, the area of the rectangle ABCD of FIG. 14 (the first aspect of machining route correction) is the same as the area of the rectangle $A_1B_1C_1D_1$ of FIG. 15 (the second aspect of machining route correction). Due to this, the "playing" space of the rectangle $A_1B_1C_1D_1$ of FIG. 15 may be corrected based on the area of the triangle $A_1E_1G_1$ of FIG. 15 having the same area as the triangle AEB of FIG. 14.

The area of the triangle AEB of FIG. 14 is calculated according to the following expression (2).

$$S_{\Delta AEB} = \frac{AB \times h}{2} \quad (2)$$
$$= \frac{\text{offset}/\tan(\theta/2) \times (v \times \sin\theta)}{2}$$

The area of the triangle $A_1E_1G_1$ of FIG. 15 is calculated according to the following expression (3).

$$S_{\Delta A1E1G1} = \frac{A1G1 \times h1}{2} \quad (3)$$
$$= \frac{v \times (a \times \sin\theta)}{2}$$

When the area ($S_{\Delta A1E1G1}$) of the triangle $A_1E_1G_1$ of FIG. 15 is the same as the area ($S_{\Delta AEG}$) of the triangle AEB of FIG. 14, since the "playing" space can be corrected based on the rectangle $A_1B_1C_1D_1$ of FIG. 15, the correction distance a can be calculated according to the following expression (4) using this relation ($S_{\Delta AEG}=S_{\Delta A1E1G1}$).

$$S_{\Delta AEB} = S_{\Delta A1E1G1} \quad (4)$$
$$\frac{\text{offset}/\tan(\theta/2) \times (v \times \sin\theta)}{2} = \frac{v \times (a \times \sin\theta)}{2}$$
$$a = \text{offset}/\tan(\theta/2)$$

In this way, the correction distance a and the return distance b can be calculated according to the following expression (5).

$$a = \text{offset}/\tan(\theta/2)$$
$$b = v \quad (5)$$

From the expression (5), it can be understood that the correction distance a changes according to the corner angle θ. The correction amount changes so that up to angles of 120°, the larger the corner angle θ, the smaller the correction distance a, and the smaller the corner angle θ, the larger the correction distance a (see FIG. 16). In this manner, by calculating the correction route by setting the return distance b to a fixed value and changing the correction distance a to be variable dependent on the corner angle θ, the shape accuracy at the corner portion can be improved rather than correcting the machining route by setting both the correction distance a and the return distance b to the deflection amount of the wire electrode 3 (regardless of the corner angle θ).

C. A third aspect of machining route correction that corrects the machining route by changing both the "correction distance a" and the "return distance b" according to the corner angle θ will be described.

In the first aspect of the machining route correction, the machining route is corrected by fixing the correction distance a to the deflection amount v of the wire electrode 3 (regardless of the corner angle θ) and changing the return distance b according to the corner angle θ. Moreover, in the second aspect of the machining route correction, the machining route is corrected by changing the correction distance a according to the corner angle θ and fixing the return distance b to the deflection amount v of the wire electrode 3 (regardless of the corner angle θ).

It can be understood from the first and second aspects of machining route correction that the shape accuracy at the corner portion can be better improved by correcting the machining route by changing any one of the correction distance a and the return distance b according to the corner angle θ than correcting the same by setting both the correction distance a and the return distance b to the deflection amount v (regardless of the corner angle θ) of the wire electrode (prior art). Due to this, the shape accuracy may be further improved by correcting the machining route by changing both the correction distance a and the return distance b according to the corner angle.

Figure 17:
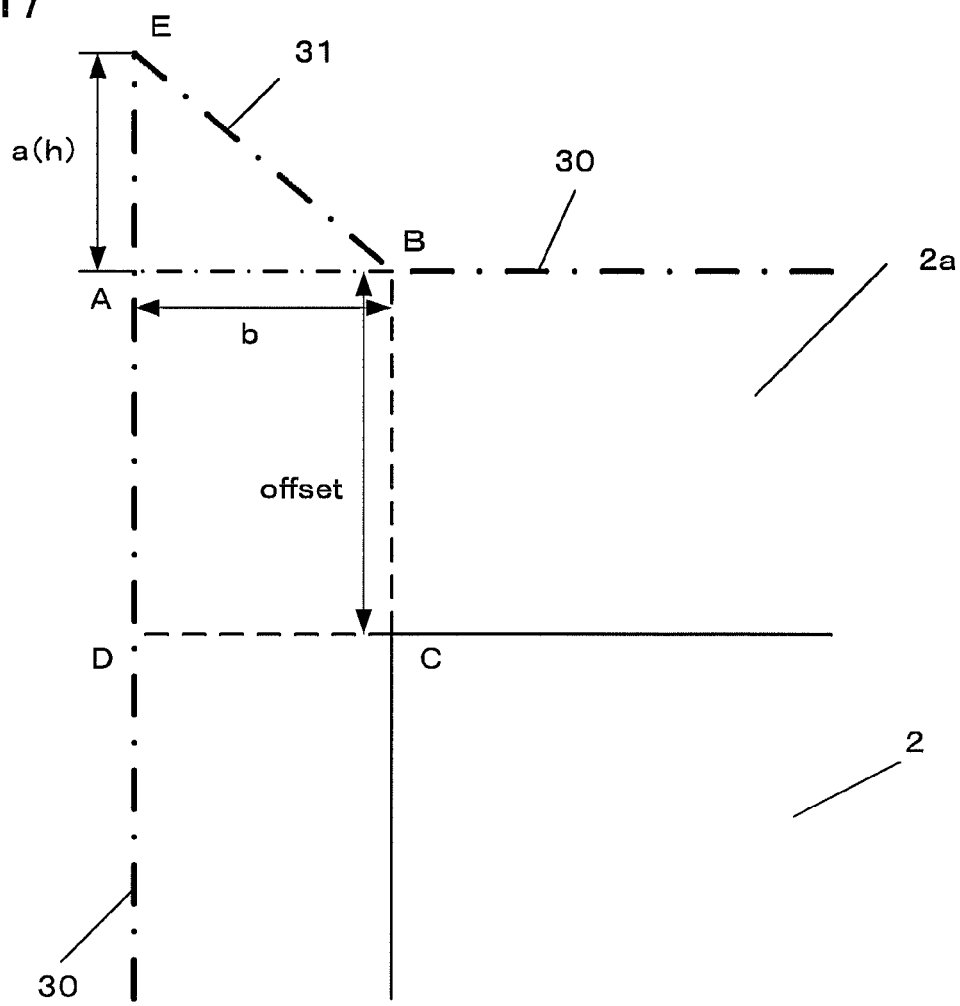
FIG. 17 is a diagram for describing a third aspect of machining route correction (case where a corner angle θ is 90°)
Figure 18:
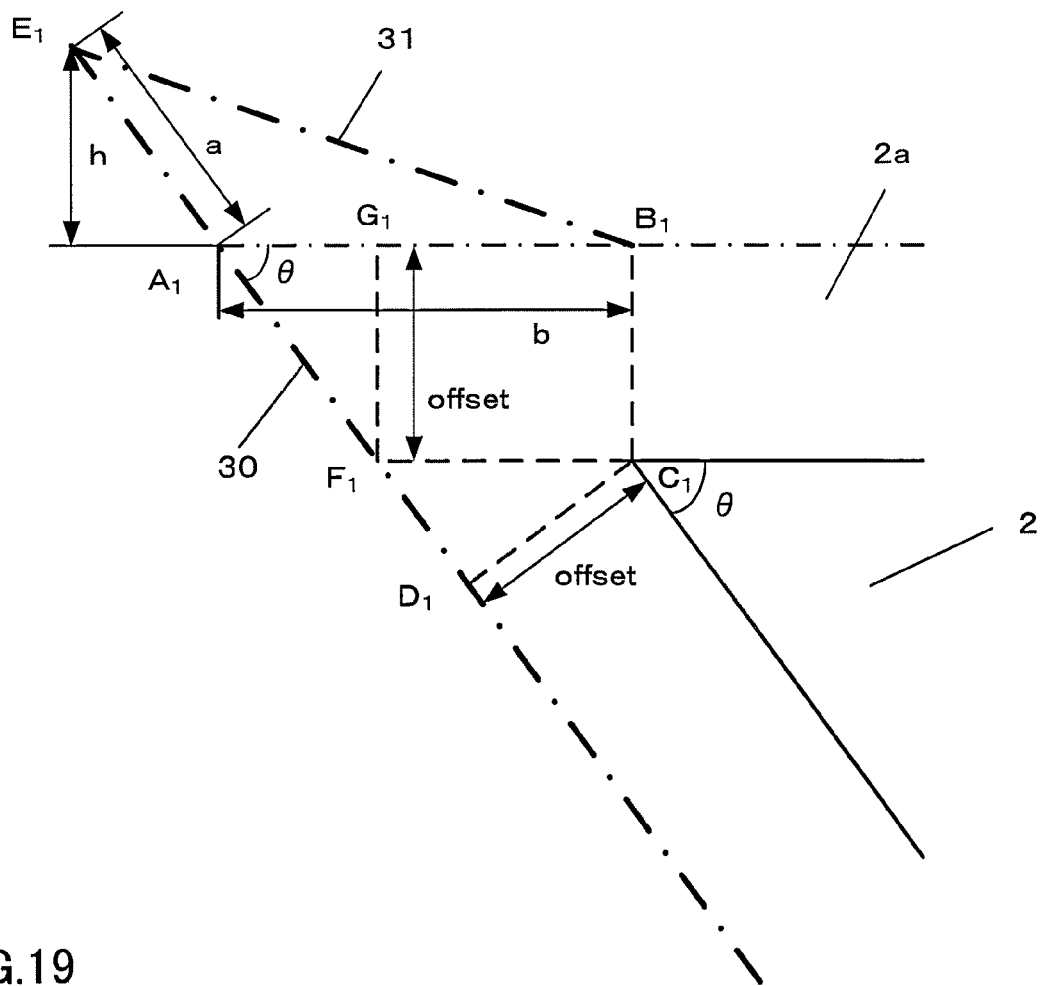
FIG. 18 is a diagram for describing the third aspect of machining route correction (case where a corner angle θ is smaller than 90°)

Therefore, in the third aspect of machining route correction, as illustrated in FIGS. 17 and 18, the machining route is corrected by changing both the correction distance a and the return distance b according to the corner angle. In FIG. 17, points on two machining routes forming a corner, separated by offset/tan(θ/2) from a corner vertex A on the machining route are B and D, respectively. Moreover, in FIG. 18, points on two machining routes forming a corner, separated by offset/tan(θ/2) from a corner vertex $A_1$ on the machining route are $B_1$ and $D_1$, respectively. The area of a rectangle ABCD formed by the corner vertex A and the points B, C, and D on the machining route in FIG. 17 and the area of a rectangle $A_1B_1C_1D_1$ formed by the corner vertex $A_1$ and the points $B_1$, $C_1$, and $D_1$ on the machining route in FIG. 18 are the "playing" space of the wire electrode at the vertex portion of the corner.

In the first aspect of the machining route correction, when the corner angle θ is 90°, the shape accuracy at the corner portion can be improved by setting the correction distance a to the deflection amount v of the wire electrode and setting the return distance b to an offset value. That is, when the corner angle θ is 90°, in order to avoid the "playing" space formed at the vertex, it is necessary to perform correction based on the area of a triangle AEB of which both sides are the correction distance a and the return distance b (see FIG. 17). Due to this, by the same reason, the shape accuracy at the corner portion can be improved if the area of the triangle $A_1E_1B_1$ for avoiding the rectangle $A_1B_1C_1D_1$ formed at the corner vertex having an optional corner angle θ in FIG. 18 is known.

In order to calculate the area of the triangle $A_1E_1B_1$, the relation between the area of the rectangle ABCD formed at the vertex having the corner angle θ of 90° illustrated in FIG.

17 and the area of the rectangle $A_1B_1C_1D_1$ formed at the corner vertex having an optional corner angle θ illustrated in FIG. 18 may be used.

In FIG. 18, the area S1 of the rectangle $A_1B_1C_1D_1$ formed at the corner having an optional corner angle θ is calculated as follows.

In triangles $A_1G_1F_1$ and $F_1D_1C_1$, the following relations are satisfied.

$$\angle G_1A_1F_1 = \angle D_1F_1C_1$$

$$\angle A_1G_1F_1 = \angle F_1D_1C_1$$

$$G_1F_1 = D_1C_1 = \text{offset}$$

Thus, it can be understood that $$\Delta A_1G_1F_1 \equiv \Delta F_1D_1C_1.$$

Therefore, the area S1 of the rectangle $A_1B_1C_1D_1$ is calculated according to the following expression (6).

$$S1 = A1B1 \times B1C1 \quad (6)$$
$$= \text{offset}/\tan(\theta/2) \times \text{offset}$$
$$= \text{offset}^2/\tan(\theta/2)$$

The area S of the rectangle ABCD formed when the corner angle θ is 90° is calculated according to the following expression (7).

$$S = BC \times CD \quad (7)$$
$$= \text{offset}^2$$

Thus, the ratio of the "playing" area formed at the corner vertex having the corner angle θ to the "playing" area when the corner angle θ is 90° is calculated according to the following expression (8).

$$\frac{S1}{S} = \frac{1}{\tan(\theta/2)} \quad (8)$$

Thus, if the area relation between the triangles $A_1E_1B_1$ (see FIG. 18) and AEB (see FIG. 17) for correcting the "playing" area satisfies the expression (8), the shape accuracy at the corner portion can be improved when the corner angle θ is an acute angle similarly to when the corner angle is 90°. Moreover, since the area (see FIG. 17) of the triangle AEB when the corner angle θ is 90° is (v×offset)/2, the area S2 of the triangle $A_1B_1E_1$ when the corner angle θ is an optional angle in FIG. 18 is calculated according to the expression (9).

$$S2 = \frac{v \times \text{offset}}{2 \times \tan(\theta/2)} \quad (9)$$

Thus, the correction distance a for correcting the corner portion having the optional corner angle θ can be calculated based on the area relation of triangles and a trigonometric function.

$$h = \frac{2(S2)}{A1B1} \quad (10)$$
$$= \frac{v \times \text{offset}}{\tan(\theta/2) \times \text{offset}/\tan(\theta/2)}$$
$$= v$$

$$a = \frac{h}{\sin\theta}$$
$$= \frac{v}{\sin\theta}$$

In this manner, the correction distance a and the return distance b can be calculated according to the following expression (11).

$$a = \frac{v}{\sin\theta} \quad (11)$$
$$b = \text{offset}/\tan(\theta/2)$$

Figure 19:
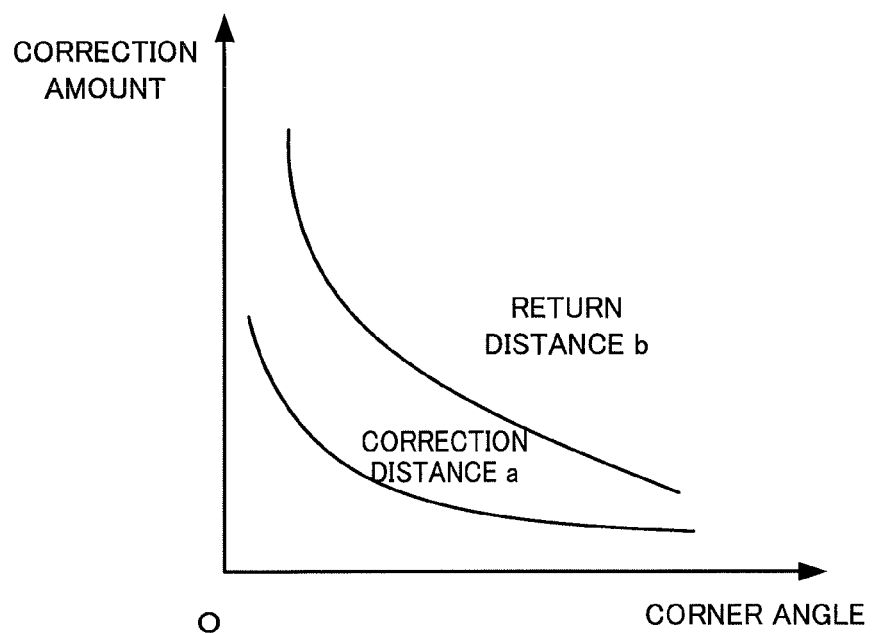
FIG. 19 is a diagram for describing a change in the corner angle a and the return distance b according to the corner angle.

As can be understood from the expression (11), both the correction distance a and the return distance b change according to the corner angle (see FIG. 19). That is, there is such a relation that up to angles of 120°, the smaller the corner angle θ, the larger both the correction distance a and the return distance b, and the larger the corner angle θ, the smaller both the correction distance a and the return distance b. In this manner, the aspect of machining route correction that changes the correction distance a and the return distance b according to the corner angle θ provides better shape accuracy than the conventional aspect of machining route correction that fixes both the correction distance and the return distance.

Figure 20:
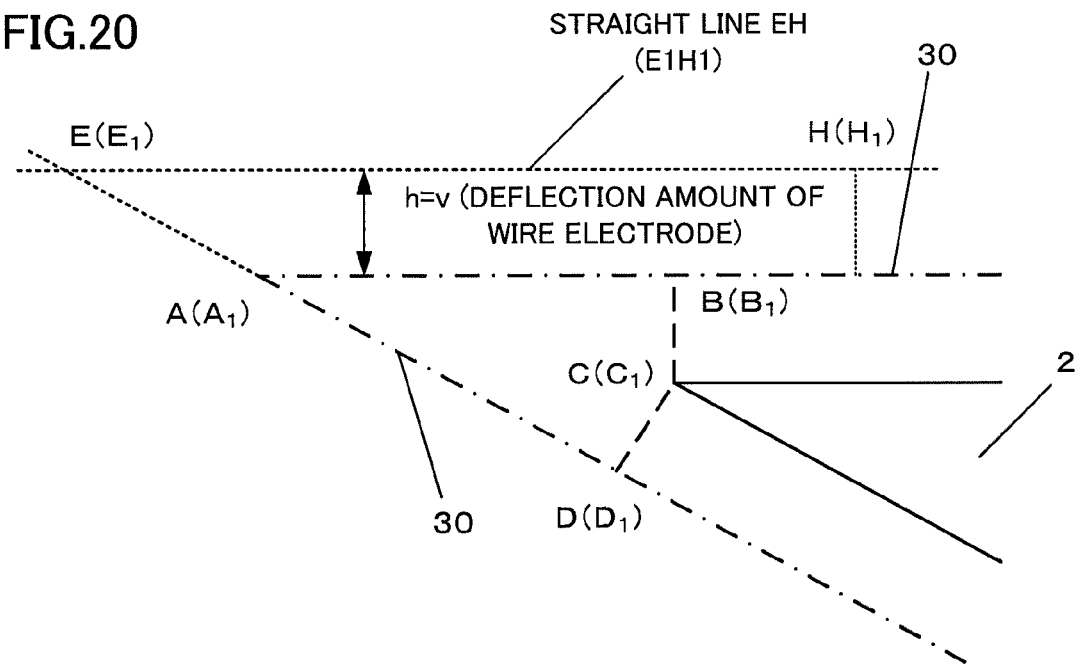
FIG. 20 is a diagram for describing an example of a method of calculating the positions of intersection points of correction routes without using the area of a polygon or a trigonometric function.

Moreover, in the third aspect of machining route correction, the position of the intersection point E ($E_1$) of the correction route is calculated using the areas of polygons and a trigonometric function as described above. However, as illustrated in FIG. 20, if a straight line separated by the deflection amount v (=h) of the wire electrode 3 from the machining route AB ($A_1B_1$) in parallel to the machining route AB ($A_1B_1$) and toward a side opposite to the workpiece 2 is EH ($E_1H_1$), the intersection point between the straight line EH ($E_1H_1$) and a straight line extended from the machining route CA ($C_1A_1$) may be calculated as E ($E_1$).

D. A fourth aspect, different from the third aspect of machining route correction, that corrects the machining route by changing both the "correction distance a" and the "return distance b" according to the corner angle θ will be described.

In the third aspect of the machining route correction, the shape accuracy at the corner portion is improved by correcting the machining route by changing both the correction distance a and the return distance b according to the corner angle θ. The machining route correction method according to the third aspect can better improve the shape accuracy at the corner portion than the conventional machining route correction method of fixing both the correction distance a and the return distance b to the deflection amount v of the wire electrode. In the following description, an example of machining route correction according to an aspect, different from the third aspect, that corrects the machining route by changing both the correction distance a and the return distance b according to the corner angle θ will be described as the fourth aspect.

As described in the first and third aspects of machining route correction, when the wire electrode 3 reaches a segment BC, although the wire electrode 3 is often deflected in a direction opposite to the machining advancing direction by being sandwiched between both walls that form the machining groove, since the wire electrode 3 is rarely deflected in the other directions, this does not have an adverse effect on the shape of the corner portion. Due to this, the return distance b may be calculated using the expression b=offset/tan(θ/2).

Figure 21:
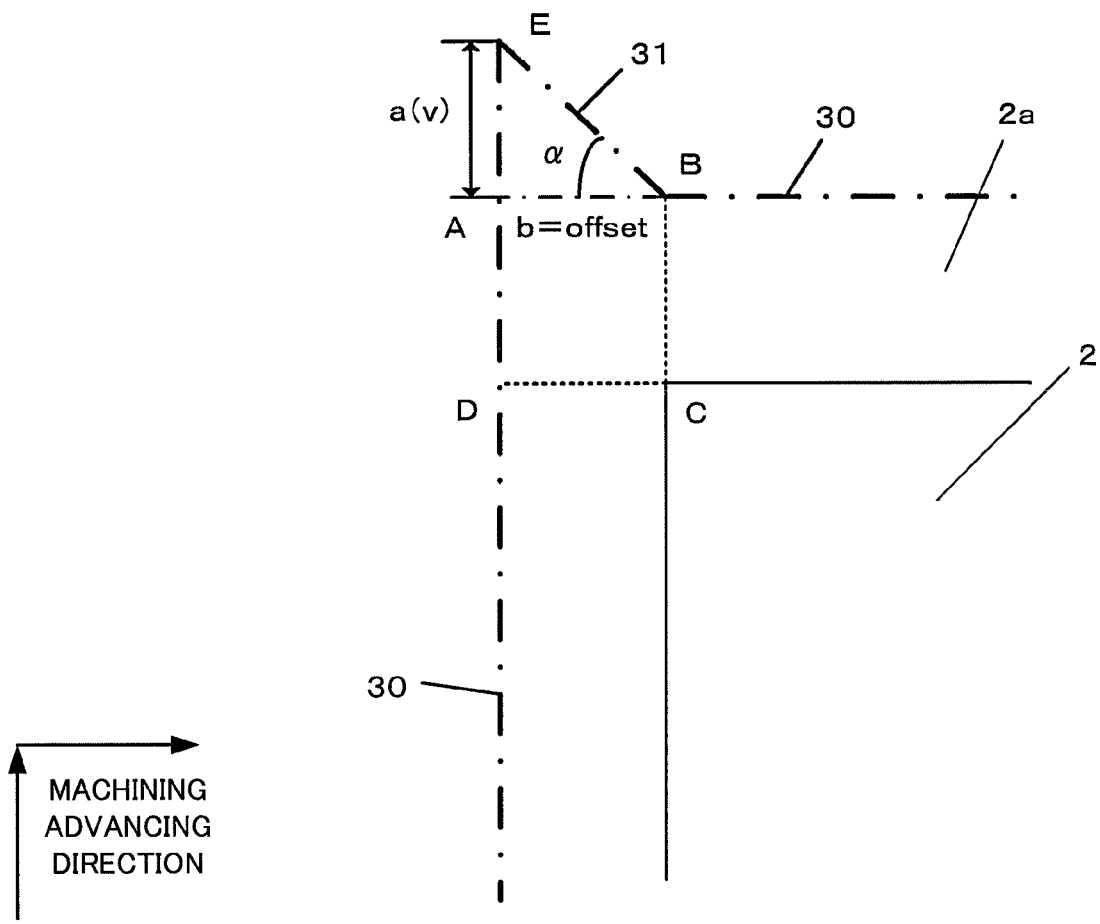
FIG. 21 is a diagram for describing a fourth aspect of machining route correction (case where the corner angle θ is 90°)
Figure 22:
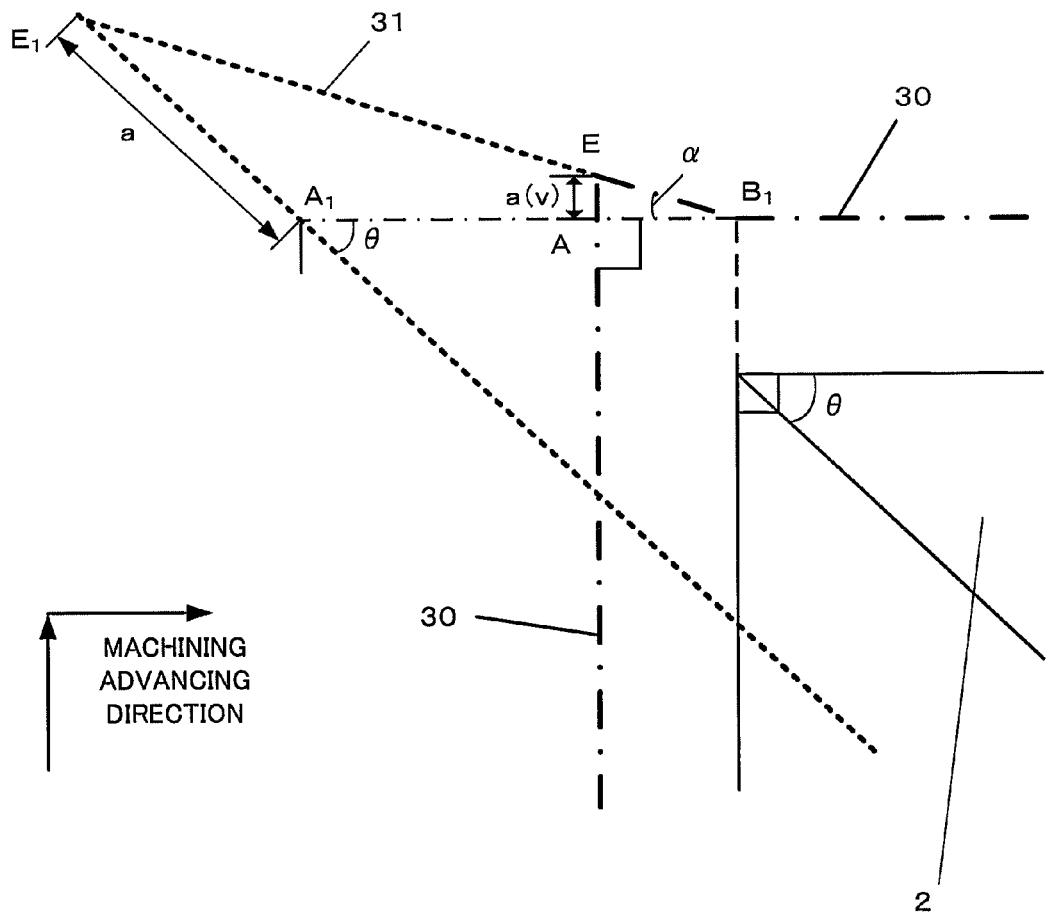
FIG. 22 is a diagram for describing the fourth aspect of machining route correction (case where the corner angle θ is smaller than 90°)

In the first aspect of machining route correction, it is described that, when the corner angle θ is 90°, high shape accuracy at the corner portion is obtained if the correction distance a is set to the deflection amount v of the wire electrode and the return distance b is set to offset/tan(θ/2). That is, as illustrated in FIG. 21, if a point separated by offset/tan(θ/2)=offset in the horizontal direction (X-axis direction) from the block intersection point A before correction is B, and a point separated by the deflection amount v of the wire electrode in the vertical direction (Y-axis direction) is E, defects at the corner portion can be corrected by causing the wire electrode 3 to return to a machining route along a segment EB that forms an angle α with respect to the machining route AB. Due to this, as illustrated in FIG. 22, when the corner angle θ is an optional angle, it is possible to improve the shape accuracy at the corner portion by causing the wire electrode to return to a machining route having the same angle. As illustrated in FIG. 21, the angle α (=∠ABE) can be calculated according to the following expression (12).

$$\tan\alpha = \frac{v}{\text{offset}} \quad (12)$$

$$\alpha = \arctan\left(\frac{v}{\text{offset}}\right)$$

Figure 23:
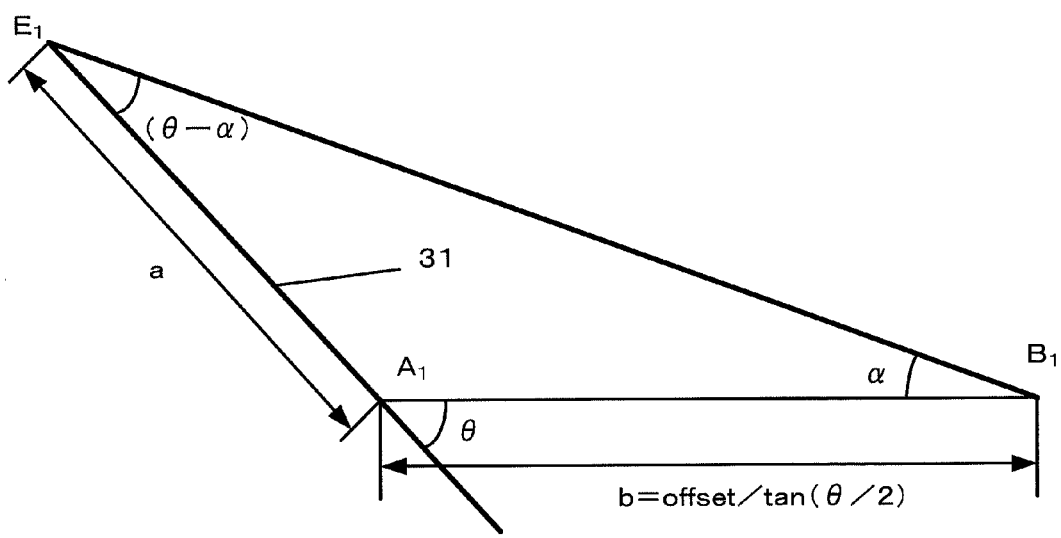
FIG. 23 is an enlarged view of a part of FIG. 22.

Since the return distance b and the angle α can be calculated in the above-described manner, the correction distance a can be calculated using the calculated return distance b and angle α and the trigonometric relation. A method of calculating the correction distance a will be described with reference to FIG. 23. FIG. 23 is an enlarged view of a triangle $A_1E_1B_1$ of FIG. 22.

In the triangle $A_1E_1B_1$, the relation of the following expression (13) is satisfied.

$$\frac{b}{\sin(\theta - \alpha)} = \frac{a}{\sin\alpha} \quad (13)$$

Since the relation of the expression (13) is satisfied, the correction distance a can be calculated according to the following expression (14).

$$a = \frac{\sin\alpha}{\sin(\theta - \alpha)} \times b \quad (14)$$

Due to this, the correction distance a and the return distance b can be calculated according to the following expression (15).

$$b = \text{offset}/\tan(\theta/2) \quad (15)$$

$$a = \frac{\sin\alpha}{\sin(\theta - \alpha)} \times b$$

where $\alpha = \arctan\left(\frac{v}{\text{offset}}\right)$

Figure 24:
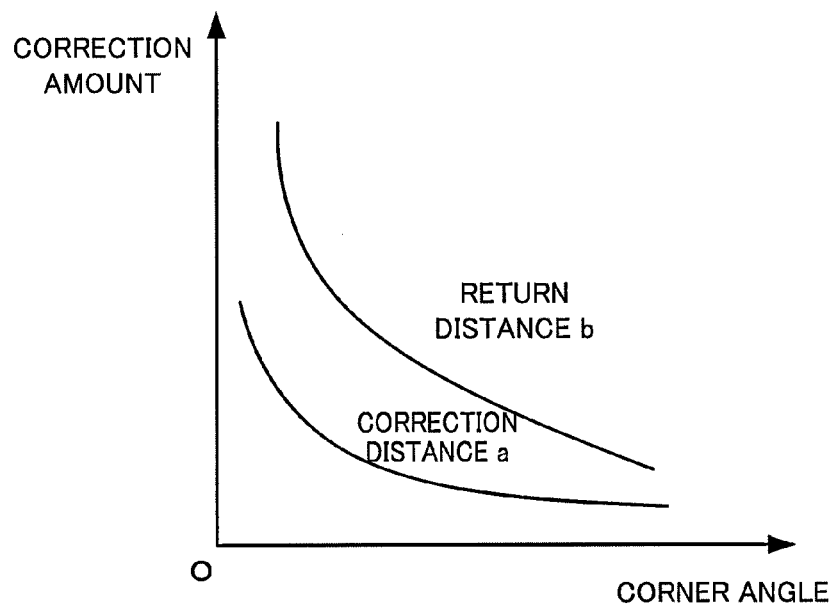
FIG. 24 is a diagram for describing a relation that, when the corner angle θ increases, both the correction distance a and the return distance b decrease.

It can be understood from the expression (15) that both the correction distance a and the return distance b change according to the corner angle θ. Further, there is such a relation that up to angles of 120°, the smaller the corner angle θ, the larger both the correction distance a and the return distance b, and the larger the corner angle θ, the smaller both the correction distance a and the return distance b (see FIG. 24). According to this aspect of machining route correction, higher shape accuracy is obtained than the conventional aspect of machining route correction that fixes both the correction distance a and the return distance b to the deflection amount v of the wire electrode.

Figure 26:
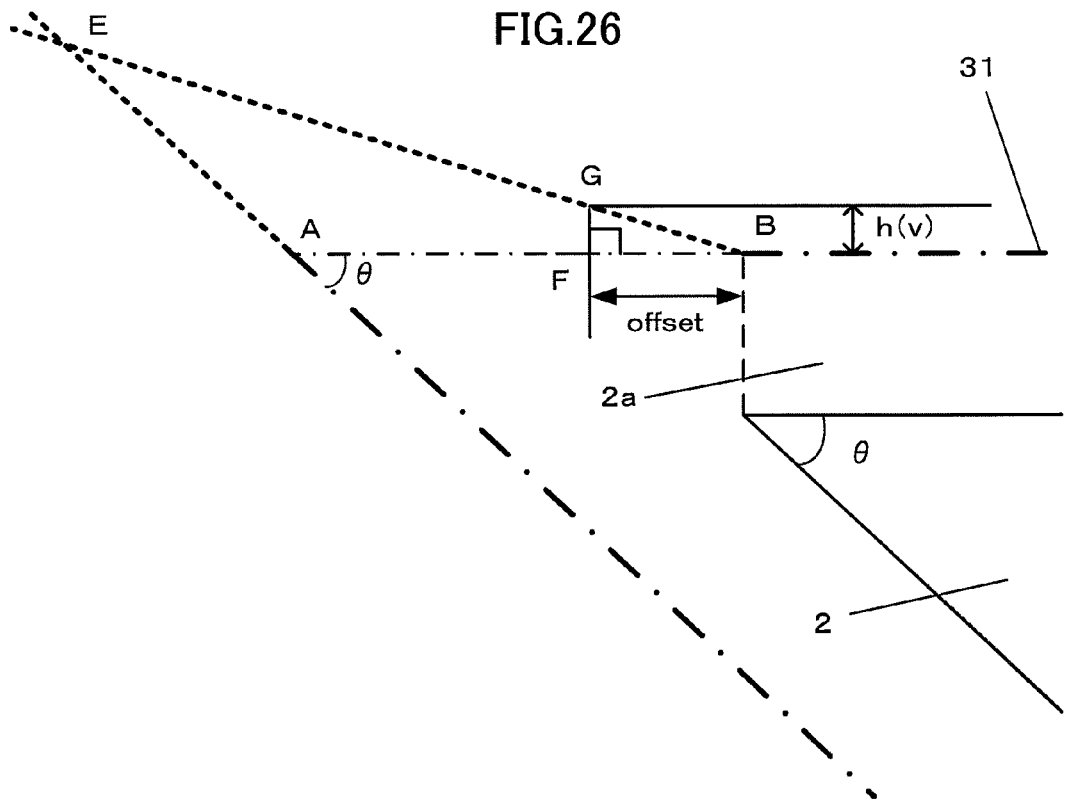
FIG. 26 is a diagram for describing a method of calculating the intersection point of correction routes.

Moreover, in the fourth aspect of machining route correction, although the position of the intersection point E ($E_1$) of the correction route is calculated by making the angle α between a return route EB ($E_1B_1$) and the machining route AB ($A_1B_1$) machined later constant, the position may be calculated as illustrated in FIG. 26. That is, the position may be calculated in such a manner that if a point separated by offset/tan(θ/2) from the intersection point A of the machining route before correction is B, and a point returned by an offset from the point B is F, then a perpendicular line FG of which the length is the deflection amount of the wire is drawn from the point F in a direction opposite to the workpiece, a straight line connecting the points B and G is extended in the direction of the segment BG, and the intersection point between the extended straight line and the machining route to be machined first is E.

Further, an aspect of a machining route method of correcting the machining route by setting the return distance b to a constant and calculating the correction distance a according to the expression (14) may be also considered. This aspect of the machining route method provides higher shape accuracy than the conventional aspect of the machining route correction that fixes both the correction distance a and the return distance b to the deflection amount v of the wire electrode.

Here, the "return distance b" in the first, third, and fourth aspects of machining route correction will be described.

In the respective aspects of machining route correction, the return distance b is determined in such a manner that the correction route returns to an original machining route at the point B (the intersecting point between the machining route and a perpendicular line drawn from the corner vertex to the machining route). However, in this method, when machining is performed under machining conditions where the flow of a machining liquid is strong (for example, when high-speed machining or thick-plate machining is performed, the wire electrode may flow into the machining groove of the block that has been machined due to the strong machining liquid flow, and the shape of the corner vertex portion may be degraded).

Figure 27:
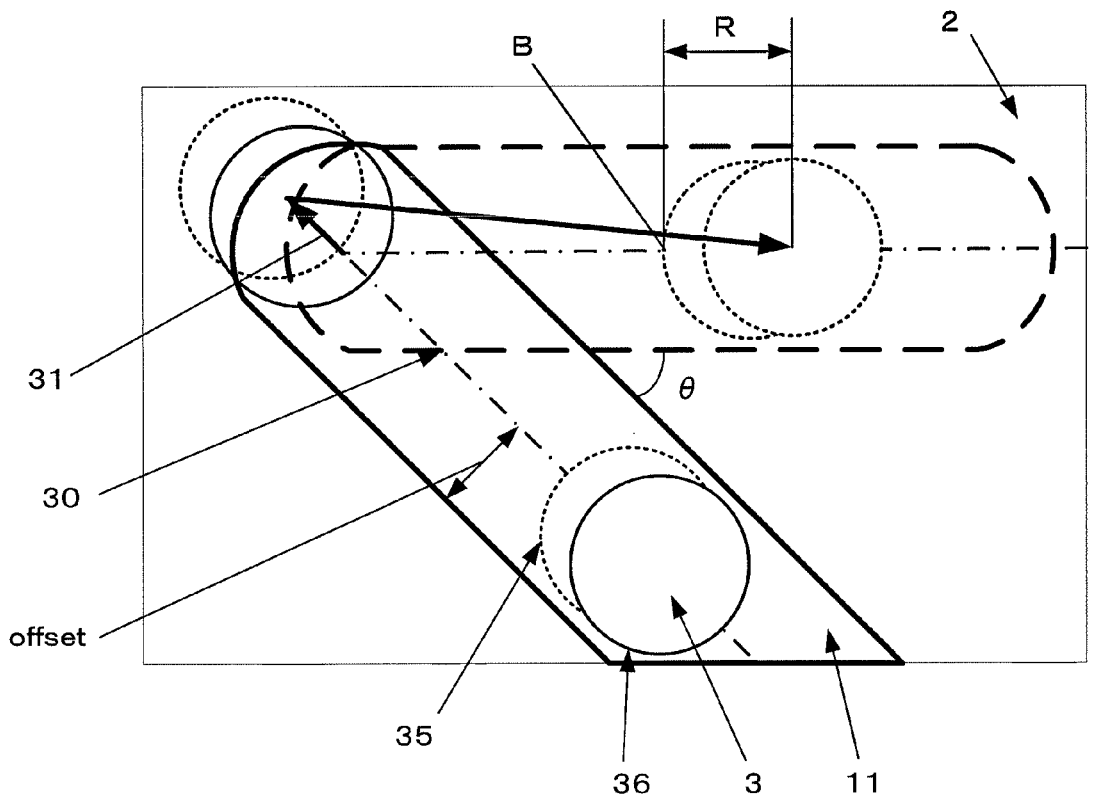
FIG. 27 is a diagram for describing the return distance b according to the first, third, and fourth aspects of machining route correction.

Thus, in such a case, it is effective to increase the return distance b to such an extent that the wire electrode is not affected by the machining groove. Specifically, as in FIG. 27, the return distance b may be determined according to the following expression (16) by causing the wire electrode to return to the original machining route at such a position that the wire electrode completely passes through the point B (for example, a position at which the wire electrode advances further from the point B by a distance (extension distance) approximately 0.5 to 1.5 times the diameter of the wire electrode or a position at which the wire electrode advances further from the point B by a distance (extension distance) corresponding to an addition of the deflection amount v of the wire electrode and the radius or the diameter of the wire electrode 3) and setting the extension distance as an optional constant R. Hereinafter, the optional constant R is referred to a constant of a wire electrode diameter.

$$b = \text{offset}/\tan(\theta/2) + R \quad (16)$$

Here, the correction distance a can be calculated based on the same thought as the respective aspects of machining route correction using the constant R.

In this example, a method of calculating the correction distance a by the same thought as the fourth aspect of machining route correction will be described. The correction distance a and the return distance b can be calculated according to the following expression (17).

$$b = \text{offset}/\tan(\theta/2) + R \quad (17)$$
$$a = \frac{\sin\theta}{\sin(\theta - \alpha)} \times b$$
$$\text{where } \alpha = \arctan\left(\frac{v}{\text{offset} + R}\right)$$

Figure 25:
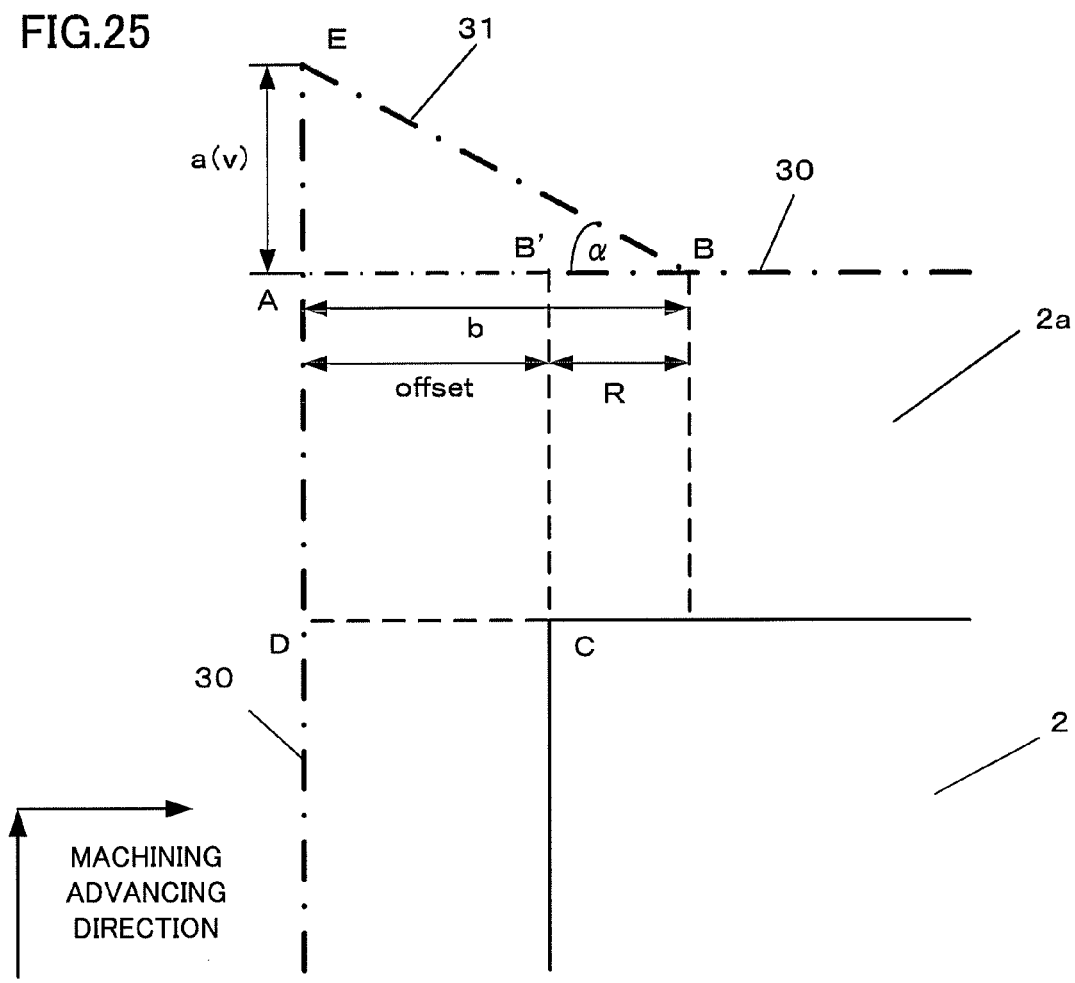
FIG. 25 is a diagram for describing a relation between the correction distance a, the return distance b, and an angle α.

The relation between the correction distance a, the return distance b, and the angle α is illustrated in FIG. 25.

Next, common points of the first to fourth aspects of machining route correction will be described to help in understanding the respective aspects of machining route correction will be described.

In the first to fourth aspects of machining route correction, by correcting the machining route by setting any one of or both of the correction distance a and the return distance b so as to increase as the corner angle θ decreases and to decrease as the corner angle θ increases, the shape accuracy at the corner portion is improved. Whichever setting is implemented, higher shape accuracy can be obtained than that by the conventional technique. In the first to fourth aspects of machining route correction, although a case where the corner portion has a right angle and an acute angle has been described as an example, the same can be applied to a case where the corner portion has an obtuse angle.

In the first to fourth aspects of machining route correction, a case where the end point of the new block (block 1') created by extending the end point of the block (block 1) to be machined first and the start point of the new block (block 2') created by removing a portion extending from the start point of the block (block 2) to be machined subsequently to the intermediate point are connected by a straight line has been described as an example. However, the line connecting two points is not limited to a straight line but may be an arc or the like.

In the first to fourth aspects of machining route correction, the deflection amount v of the wire electrode used for calculating the correction distance a and the return distance b may be a value obtained by an experiment and may be a theoretical constant or the like obtained mechanically from electrical machining conditions, strength of a machining liquid, the thickness of a wire, and the like.

Moreover, in the first to fourth aspects of machining route correction, although an offset amount (offset) is used to calculate the correction distance a and the return distance b, a wire radius corresponding to the offset amount, a constant obtained by adding a wire radius and a discharge gap, or a constant determined for each electrical machining condition may be used instead.

When these are applied to the expressions of the first to fourth aspects of machining route correction, the correction distance a and the return distance b can be expressed as follows.

(First Aspect of Machining Route Correction)

$$a = P$$

$$b = Q/\tan(\theta/2) + R$$

Here, P is a deflection amount of a wire electrode, Q is an offset amount, and R is a constant of a wire electrode diameter.

(Second Aspect of Machining Route Correction)

$$a = Q/\tan(\theta/2) + R$$

$$b = P$$

Here, P is a deflection amount of a wire electrode, Q is an offset amount, and R is a constant of a wire electrode diameter.

(Third Aspect of Machining Route Correction)

$$a = P/\sin\theta$$

$$b = Q/\tan(\theta/2) + R$$

Here, P is a deflection amount of a wire electrode, Q is an offset amount, and R is a constant of a wire electrode diameter.

(Fourth Aspect of Machining Route Correction)

$$a = b \times \sin\alpha/\sin(\theta - \alpha) \text{ Here, } \alpha = \tan^{-1}\{P/(Q+R)\}$$

$$b = Q/\tan(\theta/2) + R$$

Here, P is a deflection amount of a wire electrode, Q is an offset amount, and R is a constant of a wire electrode diameter.

Here, different points of the first to fourth aspects of machining route correction will be described.

In the first aspect of machining route correction, the machining route is corrected by fixing the correction distance a and changing the return distance b only according to the corner angle, the shape accuracy at the corner portion is improved. The conventional technique discusses the correction route specifically but does not describe in detail how the wire electrode after correction returns to the original machining route. The first aspect of machining route correction, for solving this problem, deals with how to return the wire electrode after correction to the original machining route.

In the second aspect of machining route correction, the shape accuracy at the corner portion is improved by correcting the machining route by fixing the return distance b and changing the correction distance a only according to the corner angle.

The first and second aspects of machining route correction have the common points in that the machining route is corrected by fixing any one of the correction distance a and the return distance b and changing the other one according to the corner angle.

In contrast, the third and fourth aspects of machining route correction correct the machining route by changing both the correction distance a and the return distance b according to the corner angle θ and better improve the shape accuracy at the corner portion than the conventional aspect of machining route correction that fixes both the correction distance a and the return distance b to the deflection amount v of the wire electrode. In the fourth aspect of machining route correction, the method of calculating the correction distance a is different from that of the third aspect and the machining route is corrected by calculating the correction distance a so as to make a certain angle between a return route of the wire electrode and the original machining route to be machined subsequently. With such a correction method, higher shape accuracy than the conventional technique is obtained.

What is claimed is:

1. A wire electric discharge machine that creates a machining route based on an axial movement command of a machining program, corrects the created machining program, at a corner portion formed by two consecutive moving blocks within the created machining route, by extending an end point of a block to be machined first to form a new block, removing a portion extending from a start point of a block to be machined subsequently to an intermediate point to form another new block, and connecting the end point of the new block and the start point of the other new block by a straight line or an arc, and carries out discharge machining according to the corrected machining program, the wire electric discharge machine comprising:

a corner angle acquiring unit that calculates a corner angle of the corner portion; and a machining route correcting unit that corrects the machining route according to the corner angle, wherein the machining route correcting unit sets, when the end point of the block to be machined first is extended, an extension distance of the end point as a correction distance a, and also sets a length of the portion to be removed extending from the start point of the block to be machined subsequently to the intermediate point as a return distance b, and corrects the machining route at the corner portion so that the larger the corner angle, the smaller any one of or both of the correction distance a and the return distance b.

2. The wire electric discharge machine according to claim 1, wherein the machining route correcting unit corrects the machining route by calculating the correction distance a and the return distance b according to the following:

$a=P$ $b=Q/\tan(\theta/2)+R$ where $\theta$: a corner angle
P: a deflection amount of a wire electrode
Q: an offset amount
R: a constant of a wire electrode diameter.

3. The wire electric discharge machine according to claim 1, wherein the machining route correcting unit corrects the machining route by calculating the correction distance a and the return distance b according to the following:

$a=Q/\tan(\theta/2)$ $b=P$ where $\theta$: a corner angle
P: a deflection amount of a wire electrode
Q: an offset amount.

4. The wire electric discharge machine according to claim 1, wherein the machining route correcting unit corrects the machining route by calculating the correction distance a and the return distance b according to the following:

$a=b\times\sin\alpha/\sin(\theta-\alpha)$ $b=P$ where $\alpha=\tan^{-1}\{P/(Q+R)\}$
$\theta$: a corner angle
P: a deflection amount of a wire electrode
Q: an offset amount
R: a constant of a wire electrode diameter.

5. The wire electric discharge machine according to claim 1, wherein the machining route correcting unit corrects the machining route by calculating the correction distance a and the return distance b according to the following:

$a=P/\sin\theta$ $b=Q/\tan(\theta/2)+R$ where $\theta$: a corner angle
P: a deflection amount of a wire electrode
Q: an offset amount
R: a constant of a wire electrode diameter.

6. The wire electric discharge machine according to claim 1, wherein the machining route correcting unit corrects the machining route by calculating the correction distance a and the return distance b according to the following:

$a=b\times\sin\alpha/\sin(\theta-\alpha)$ $b=Q/\tan(\theta/2)+R$ where $\alpha=\tan^{-1}\{P/(Q+R)\}$
$\theta$: a corner angle
P: a deflection amount of a wire electrode
Q: an offset amount
R: a constant of a wire electrode diameter.

7. The wire electric discharge machine according to claim 2, wherein a constant determined for each of electrical machining conditions is used instead of the deflection amount of the wire electrode, and the offset amount is any one of a radius value of the wire electrode, a value obtained by adding the radius value of the wire electrode and a discharge gap, and the constant determined for each of the electrical machining conditions.

* * * * *